(12) United States Patent  
Santra et al.

(10) Patent No.: US 10,775,493 B2  
(45) Date of Patent: Sep. 15, 2020

(54) SYSTEM AND METHOD FOR CONTROLLING ACCESS TO A TRUNK OF A VEHICLE USING A RADAR SENSOR

(71) Applicant: Infineon Technologies AG, Neubiberg (DE)

(72) Inventors: Avik Santra, Munich (DE); Ashutosh Baheti, Munich (DE); Neha Baheti, Munich (DE); Jens Reinstaedt, Munich (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 168 days.

(21) Appl. No.: 15/938,478

(22) Filed: Mar. 28, 2018

(65) Prior Publication Data

US 2019/0302253 A1 Oct. 3, 2019

(51) Int. Cl.
*G01S 13/58* (2006.01)
*G01S 13/90* (2006.01)
(Continued)

(52) U.S. Cl.
CPC ............ *G01S 13/583* (2013.01); *G01S 7/032* (2013.01); *G01S 7/354* (2013.01); *G01S 7/415* (2013.01); *G01S 13/64* (2013.01); *G01S 13/87* (2013.01); *G01S 13/88* (2013.01); *G01S 13/904* (2019.05); *G01S 7/414* (2013.01); *G01S 13/9064* (2019.05); *G01S 2007/356* (2013.01); *G01S 2013/93272* (2020.01)

(58) Field of Classification Search
CPC ........ G01S 13/583; G01S 13/93; G01S 13/88; G01S 13/931; G01S 13/584; G01S 7/354; G01S 13/34; G01S 13/35

USPC ......... 340/5.72, 5.61, 5; 342/8, 70, 25, 28, 9
See application file for complete search history.

(56) References Cited

U.S. PATENT DOCUMENTS

| 4,906,035 A | 3/1990 | Nagai et al. |
| 6,781,540 B1 * | 8/2004 | MacKey ................ G01S 13/90 342/188 |

(Continued)

FOREIGN PATENT DOCUMENTS

| CN | 105372659 A * 3/2016 |
| EP | 1473426 A1 11/2004 |

(Continued)

OTHER PUBLICATIONS

Russell "Millimeter Wave Radar Sensor for automation intelligent cruise control (ICC)" IEEE Transactions on Microwave Theory and Techniques (vol. 45, Issue:12, Dec. 1997 p. 2444-2453). (Year: 1997).*

*Primary Examiner* — Vladimir Magloire
*Assistant Examiner* — Monark Sharma
(74) *Attorney, Agent, or Firm* — Slater Matsil, LLP

(57) ABSTRACT

An embodiment method includes: receiving radar data at a millimeter-wave radar sensor, the radar data being generated in response to an incident radio-frequency signal reflecting off an object located in a field of view of the millimeter-wave radar sensor; filtering the radar data to generate a first-filtered signal; determining a trajectory of motion corresponding to the first-filtered signal; and determining whether the trajectory of motion corresponds to a human signature, the human signature being associated with a respective operation of a vehicle.

24 Claims, 15 Drawing Sheets

(51) Int. Cl.
*G01S 7/35* (2006.01)
*G01S 13/87* (2006.01)
*G01S 13/88* (2006.01)
*G01S 7/41* (2006.01)
*G01S 7/03* (2006.01)
*G01S 13/64* (2006.01)
*G01S 13/931* (2020.01)

(56) References Cited

U.S. PATENT DOCUMENTS

| | | | |
|---|---|---|---|
| 7,283,034 B2 * | 10/2007 | Nakamura | B60R 25/246 |
| | | | 340/5.72 |
| 7,688,179 B2 | 3/2010 | Kurpinkshi et al. | |
| 2002/0121967 A1 | 9/2002 | Bowen et al. | |
| 2006/0082436 A1 | 4/2006 | Kamiya et al. | |
| 2014/0169139 A1 | 6/2014 | Lee | |
| 2015/0009062 A1 * | 1/2015 | Herthan | G01S 7/415 |
| | | | 342/70 |
| 2015/0226848 A1 * | 8/2015 | Park | G01S 13/584 |
| | | | 342/70 |

FOREIGN PATENT DOCUMENTS

| | | | | |
|---|---|---|---|---|
| WO | 2008063691 A2 | 5/2008 | | |
| WO | WO-2008063691 A2 * | 5/2008 | | G01S 7/411 |
| WO | 2016170005 A1 | 10/2016 | | |

* cited by examiner

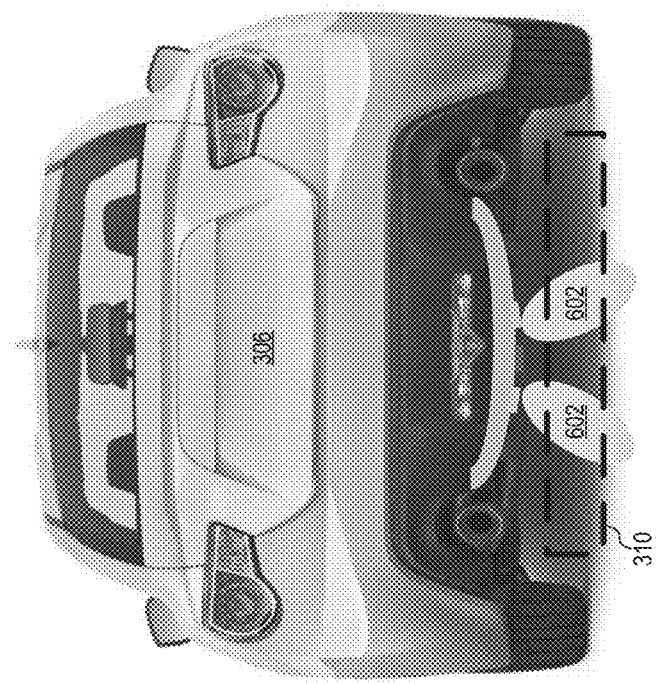
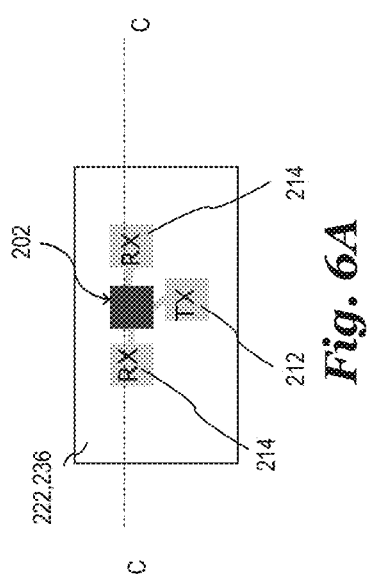
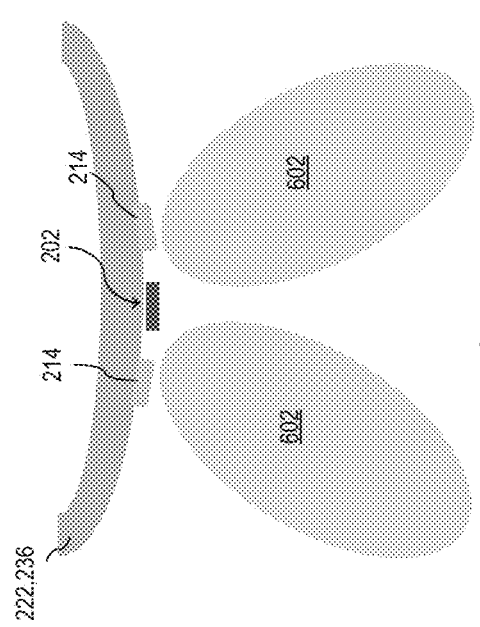
Fig. 6A
Fig. 6B
Fig. 6C

US 10,775,493 B2

SYSTEM AND METHOD FOR CONTROLLING ACCESS TO A TRUNK OF A VEHICLE USING A RADAR SENSOR

TECHNICAL FIELD

The present invention relates generally to electronic systems, and, in particular embodiments, to a system and method for controlling access to a trunk of a vehicle using radar sensors.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques. A MIMO configuration with multiple chipsets can be used to perform coherent and non-coherent signal processing, as well.

SUMMARY

An embodiment method includes: receiving radar data at a millimeter-wave radar sensor, the radar data being generated in response to an incident radio-frequency signal reflecting off an object located in a field of view of the millimeter-wave radar sensor; filtering the radar data to generate a first-filtered signal; determining a trajectory of motion corresponding to the first-filtered signal; and determining whether the trajectory of motion corresponds to a human signature, the human signature being associated with a respective operation of a vehicle.

An embodiment system includes: a processing system configured to be coupled to a millimeter-wave radar sensor. The processing system is configured to: instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; filter the radar data to generate a first-filtered signal; determine a trajectory of motion corresponding to the first-filtered signal; and determine whether the trajectory of motion corresponds to a human signature, the human signature being associated with a respective operation of a vehicle.

An embodiment non-transitory computer readable storage medium includes an executable program stored thereon. The executable program includes instructions to: instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; filter the radar data to generate a first-filtered signal; determine a trajectory of motion corresponding to the first-filtered signal; and determine whether the trajectory of motion corresponds to a human signature, the human signature being associated with a respective operation of a vehicle.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A to 6C show another example where the millimeter-wave radar sensor systems of FIGS. 1 and 2A to 2C include a single millimeter-wave radar sensor circuit disposed on a curvilinear substrate;

Figure 1:
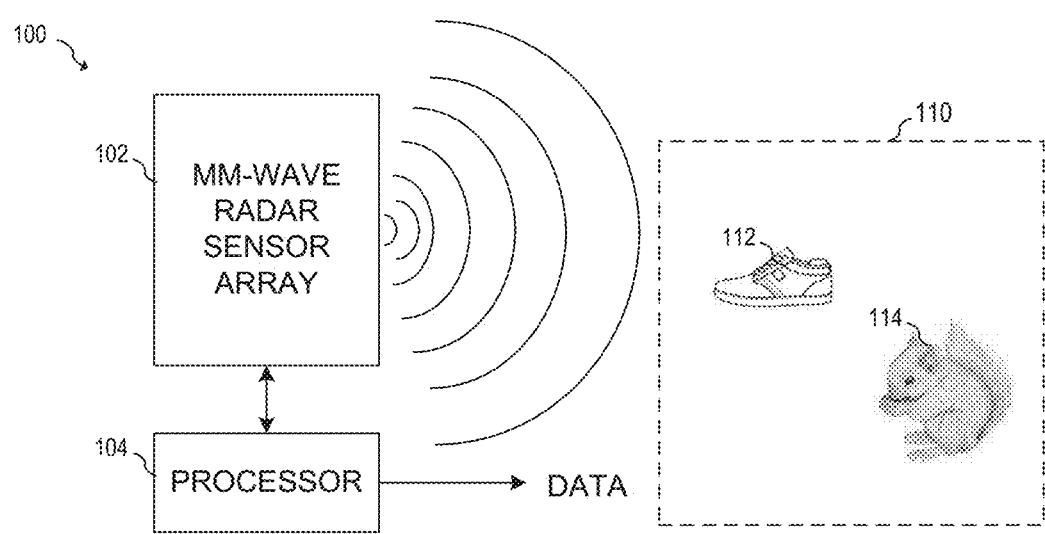
FIG. 1 illustrates a block diagram of a millimeter-wave radar sensor system, in accordance with an embodiment.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The trunk or luggage compartment of a vehicle is the main storage compartment of the vehicle and is normally located at the end of the vehicle opposite to the end at which the vehicle's engine is located. Current and past systems of controlling access to the trunk of the vehicle include the following: (1) metal key systems (e.g. where a human being physically inserts a metal key into a keyhole included in the trunk of the vehicle to lock or unlock the trunk); (2) electronic key systems (e.g. where a human being presses a button on an electronic key fob to lock, unlock, open, or close the trunk); (3) keyless go systems including an ultrasonic sensor; and (4) keyless go systems including a capacitive sensor. Other sensors that control access to the trunk of the vehicle may include laser emitters and transducers. While such systems of accessing the trunk of the vehicle are available, several undesirable features are associated with these current and past systems. For example, capacitive sensing systems are susceptible to electromagnetic compatibility (EMC) disturbances and do not function optimally in wet conductions (e.g. in rainy weather) or where salt water is present. Furthermore, when used in combination with conductive bumpers, these capacitive sensing systems may be prematurely or wrongly triggered, thereby increasing the false alarm rate of capacitive sensing systems. As another example, ultrasonic sensing systems may be susceptible to false triggers (e.g. when an object or animals moves into or circles the sensing zone for a prescribed of time, thereby simulating a foot gesture). As further examples, laser emitters do not work optimally in dusty conditions or in dark environments (e.g. at night or in places with low illumination), and transducers require a direct line of sight to ground (and this may not be possible if such transducers are covered by a plastic material of the bumper).

The present invention will be described with respect to preferred embodiments. The present disclosure presents a system and method for controlling access to a trunk of a vehicle using a millimeter-wave radar sensor. The proposed system and method allows for a human being to interact with the vehicle (e.g. via movement of a foot of the human being) in order to open or close the trunk of the vehicle. As described in the following paragraphs, the proposed system and method provide advantages over current and past solutions, with such advantages including robustness against EMC disturbances; robustness against false alarm rates (e.g. by implementing machine learning algorithms); the radar sensors being able to be optimized/operable with conductive bumpers; the radar sensors being agnostic to environmental conditions or impact, and thus being able to operate robustly in wet or salt water conditions, dust, fog, and low-light conditions; and the radar sensors being able to be embedded in the bumper in small form-factors. The proposed system and method are also able to detect a human foot and to recognize a human foot signature, thus reducing false alarms and eliminating other environmental interferences. The proposed system and method are further able to eliminate Doppler-sensed motion from other objects in the vicinity of the radar sensor, further reducing false alarms.

FIG. 1 illustrates a block diagram of a millimeter-wave radar sensor system 100, in accordance with an embodiment. The millimeter-wave radar sensor system 100 may be used to implement the proposed system and method for controlling access to a trunk of a vehicle. As shown in FIG. 1, millimeter-wave radar sensor system 100 includes a millimeter-wave radar sensor 102 and a processor 104 that controls the operation of millimeter-wave radar sensor 102. The processor 104 performs various radar signal processing operations on the data produced by millimeter-wave radar sensor 102. During operation, millimeter-wave radar sensor 102 transmits millimeter-wave RF signals that are reflected by various objects 112 and 114 that are present within an area 110. In the example of FIG. 1, first object 112 is illustrated as being a human foot, while second object 114 is illustrated as being an object other than a human foot. The area 110 may represent any finite area within the field-of-view of the millimeter-wave radar sensor 102 and may represent, for example, an area in front of, adjacent to, or below a bumper of a vehicle. The area 110 may also be any other physical area in which the presence of objects may be detected by the millimeter-wave radar sensor 102. As discussed below in reference to FIG. 3A, the millimeter-wave radar system 100 may be integrated into or mounted on a surface of a vehicle's bumper.

Millimeter-wave RF signals reflected by the objects 112 and 114 are received by the millimeter-wave radar sensor 102. The received RF signals are converted to a digital representation, for example, by an analog-to-digital converter included in the millimeter-wave radar sensor 102 or coupled between the millimeter-wave radar sensor 102 and the processor 104. The digital representation of the received RF signals may be processed by the processor 104 for at least one of the following purposes: (1) determining and tracking a trajectory traced by the motion of each of the objects 112 and 114; (2) determining the presence of a human foot within the area 110 (e.g. by discriminating between the signals generated by objects 112 and 114); and (3) tracking a trajectory of the first object 112 in response to a determination that the object 112 is a human foot. The result of this processing produces various data (represented in FIG. 1 by signal DATA) that may be indicative of the trajectory traced by the motion of each of the objects 112 and 114 and/or the presence of a human foot within the area 110, and such data may be used to control access to the trunk of the vehicle.

In embodiments that utilize a frequency modulated continuous wave (FMCW) radar sensor, the presence, location, and/or motion of each object 112, 114 within the area 110 may be determined by taking a range fast Fourier transform (FFT) of the baseband radar signal produced by the millimeter-wave radar sensor 102, and the motion of the various objects may be determined, for example, by taking a further FFTs to determine each object's velocity using Doppler analysis techniques known in the art. In embodiments in which the millimeter-wave radar sensor 102 includes a receive antenna array, further FFTs may also be used to determine the azimuth of each object 112, 114 with respect to the millimeter-wave radar sensor 102. The various methods used to determine the presence, location, and/or motion of each object 112, 114 are discussed in further detail below in reference to FIGS. 8 and 13.

Figure 2A:
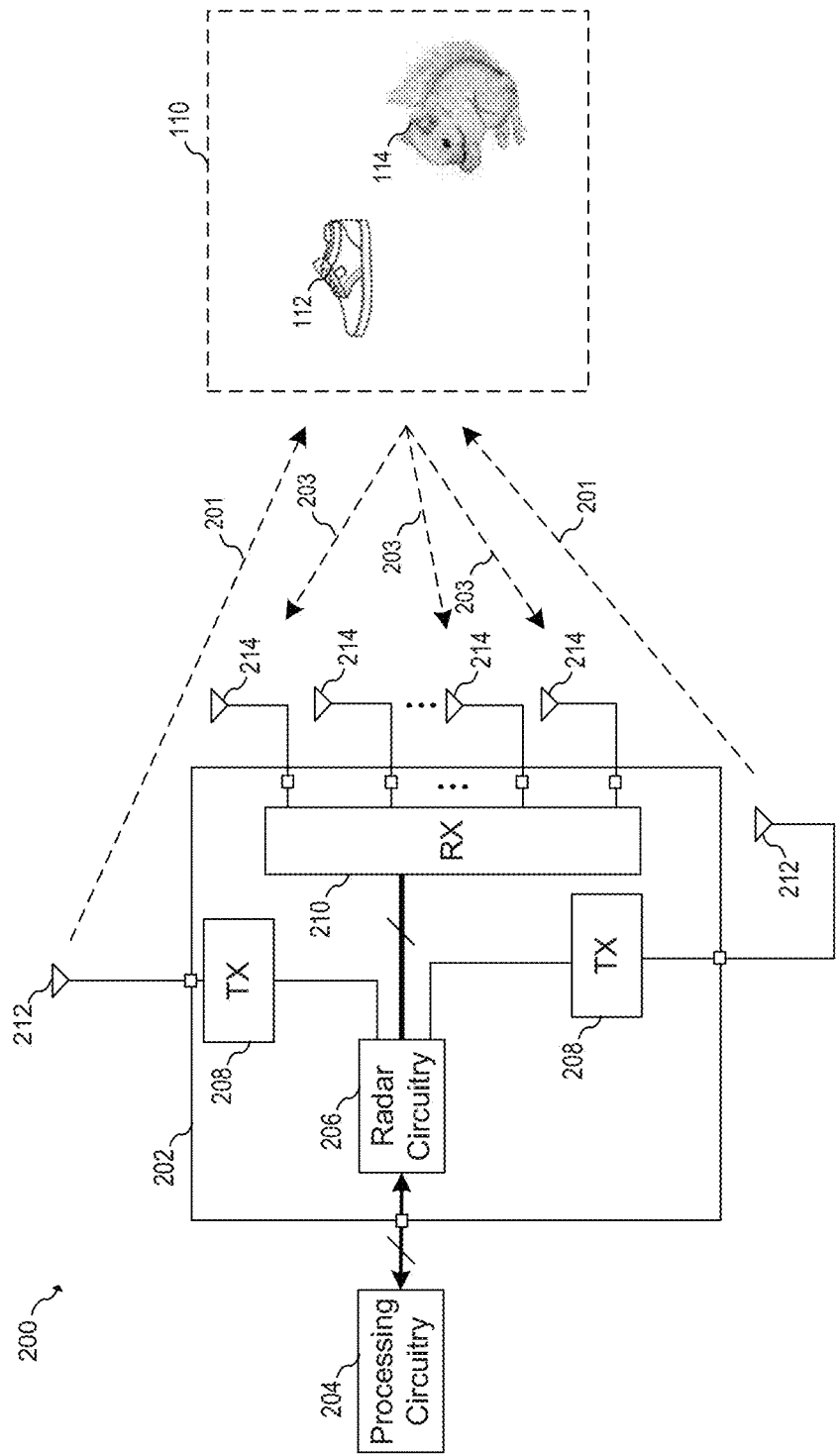
FIGS. 2A, 2B and 2C illustrate various implementation scenarios of embodiment radar-based systems that control access to a vehicle.

FIG. 2A illustrates a block diagram of a millimeter-wave radar sensor system 200 that may be used to implement millimeter-wave radar sensor circuits in the various disclosed embodiments (e.g. such as the millimeter-wave radar sensor system 100 shown in FIG. 1). Millimeter-wave radar sensor system 200 includes a millimeter-wave radar sensor circuit 202 and processing circuitry 204. Embodiment millimeter-wave radar sensor circuits may be implemented, for example, using a two-dimensional millimeter-wave phase-array radar. The millimeter-wave phase-array radar transmits and receives signals in the 20 GHz to 122 GHz range. Alternatively, frequencies outside of this range may also be used. In some embodiments, the millimeter-wave radar sensor circuit 202 operates as a FMCW radar circuit having multiple transmit and receive channels. Alternatively, other types of radar circuits may be used such as a continuous wave radar circuit, a fixed beam radar circuit, a pulse radar circuit, a Monte Carlo forecasting of waves (MCFW) radar circuit, and non-linear frequency modulation (NLFM) radar circuit to implement millimeter-wave radar sensor circuit 202.

The millimeter-wave radar sensor circuit 202 transmits and receives radio signals for detecting the presence and motion of objects 112, 114 in three-dimensional space. For example, the millimeter-wave radar sensor circuit 202 transmits incident RF signals 201 and receives RF signals 203 that are reflection of the incident RF signals from one or more of the objects 112, 114. The received reflected RF signals 203 are down-converted by the millimeter-wave radar sensor circuit 202 to determine beat frequency signals. These beat frequency signals may be used to determine information such as the location, speed, angle, etc., of the objects 112, 114 in three-dimensional space.

In various embodiments, the millimeter-wave radar sensor circuit 202 is configured to transmit incident RF signals 201 toward the objects 112, 114 via transmit antennas 212 and to receive reflected RF signals 203 from the objects 112, 114 via receive antennas 214. The millimeter-wave radar sensor circuit 202 includes transmitter front-end circuits 208 coupled to transmit antennas 212 and receiver front-end circuit 210 coupled to receive antennas 214.

During operation, transmitter front-end circuits 208 may transmit RF signals toward the objects 112, 114 simultaneously or individually using beamforming depending on the phase of operation. While two transmitter front-end circuits 208 are depicted in FIG. 2A, it should be appreciated that millimeter-wave radar sensor circuit 202 may include greater than two transmitter front-end circuits 208. Thus, in various embodiments, the number of transmitters can be extended to n×m. Each transmitter front-end circuit 208 includes circuitry configured to produce the incident RF signals. Such circuitry may include, for example, RF oscillators, up-converting mixers, RF amplifiers, variable gain amplifiers, filters, transformers, power splitters, and other types of circuits.

Receiver front-end circuit 210 receives and processes the reflected RF signals from the objects 112, 114. As shown in FIG. 2A, receiver front-end circuit 210 is configured to be coupled to four receive antennas 214, which may be configured, for example, as a 2×2 antenna array. In alternative embodiments, receiver front-end circuit 210 may be configured to be coupled to greater or fewer than four antennas, with the resulting antenna array being of various n×m dimensions depending on the specific embodiment and its specifications. Receiver front-end circuit 210 may include, for example, RF oscillators, up-converting mixers, RF amplifiers, variable gain amplifiers, filters, transformers, power combiners and other types of circuits.

Radar circuitry 206 provides signals to be transmitted to transmitter front-end circuits 208, receives signals from receiver front-end circuit 210, and may be configured to control the operation of millimeter-wave radar sensor circuit 202. In some embodiments, radar circuitry 206 includes, but is not limited to, frequency synthesis circuitry, up-conversion and down-conversion circuitry, variable gain amplifiers, analog-to-digital converters, digital-to-analog converters, digital signal processing circuitry for baseband signals, bias generation circuits, and voltage regulators.

Radar circuitry 206 may receive a baseband radar signal from processing circuitry 204 and control a frequency of an RF oscillator based on the received baseband signal. In some embodiments, this received baseband signal may represent a FMCW frequency chip to be transmitted. Radar circuitry 206 may adjust the frequency of the RF oscillator by applying a signal proportional to the received baseband signal to a frequency control input of a phase locked loop. Alternatively, the baseband signal received from processing circuitry 204 may be up-converted using one or more mixers. Radar circuitry 206 may transmit and digitize baseband signals via a digital bus (e.g., a USB bus), transmit and receive analog signals via an analog signal path, and/or transmit and/or receive a combination of analog and digital signals to and from processing circuitry 204.

Processing circuitry 204 acquires baseband signals provided by radar circuitry 206 and formats the acquired baseband signals for transmission to an embodiment signal processing unit. These acquired baseband signals may represent beat frequencies, for example. In some embodiments, processing circuitry 204 includes a bus interface (not shown) for transferring data to other components within the radar-based detection system. Optionally, processing circuitry 204 may also perform signal processing steps used by embodiment detection systems such as an FFT, a short-time Fourier transform (STFT), macro-Doppler analysis, micro-Doppler analysis, vital-Doppler analysis, object classification, machine learning, and the like. In addition to processing the acquired baseband signals, processing circuitry 204 may also control aspects of millimeter-wave radar sensor circuit 202, such as controlling the transmissions produced by millimeter-wave radar sensor circuit 202.

The various components of millimeter-wave radar sensor system 200 may be partitioned in various ways. For example, millimeter-wave radar sensor circuit 202 may be implemented on one or more RF integrated circuits (RFICs) or monolithic microwave integrated circuits (MMICs), antennas 212 and 214 may be disposed on a circuit board, and processing circuitry 204 may be implemented using a processor, a microprocessor, a digital signal processor and/or a custom logic circuit disposed on one or more integrated circuits/semiconductor substrates. Processing circuitry 204 may include a processor that executes instructions in an executable program stored in a non-transitory computer readable storage medium, such as a memory to perform the functions of processing circuitry 204. In some embodiments, however, all or part of the functionality of processing circuitry 204 may be incorporated on the same integrated circuit/semiconductor substrate on which millimeter-wave radar sensor circuit 202 is disposed.

In some embodiments, some or all portions of millimeter-wave radar sensor circuit 202 may be implemented in a package that contains transmit antennas 212, receive antennas 214, transmitter front-end circuits 208, receiver front-end circuit 210, and/or radar circuitry 206. In some embodiments, millimeter-wave radar sensor circuit 202 may be implemented as one or more integrated circuits disposed on a circuit board, and transmit antennas 212 and receive antennas 214 may be implemented on the circuit board adjacent to the integrated circuits. In some embodiments, transmitter front-end circuits 208, receiver front-end circuit 210, and radar circuitry 206 are formed on a same radar front-end integrated circuit (IC) die. Transmit antennas 212 and receive antennas 214 may be part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of millimeter-wave radar sensor circuit 202. In an embodiment, transmit antennas 212 and receive antennas 214 may be implemented using the RDLs of the radar front-end IC die.

Figure 2B:
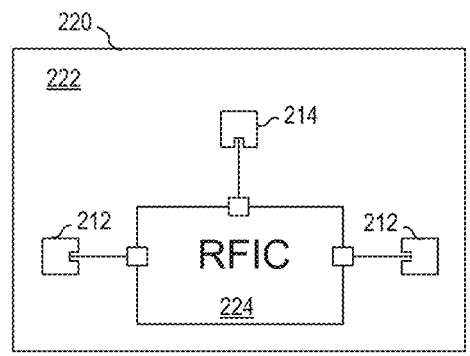

FIG. 2B illustrates a plan view of millimeter-wave radar sensor circuit 220 that may be used to implement millimeter-wave radar sensor circuit 202. As shown, millimeter-wave radar sensor circuit 220 is implemented as an RFIC or MMIC 224 coupled to transmit antennas 212 and receive antenna 214 implemented as patch antennas disposed on or within substrate 222. In some embodiments, substrate 222 may be implemented using a circuit board on which millimeter-wave radar sensor circuit 202 is disposed and on which transmit antennas 212 and receive antennas 214 are implemented using conductive layers of the circuit board. Alternatively, substrate 222 represents a wafer substrate on which one or more RDLs are disposed and on which transmit antennas 212 and receive antennas 214 are implemented using conductive layers on the one or more RDLs.

Figure 2C:
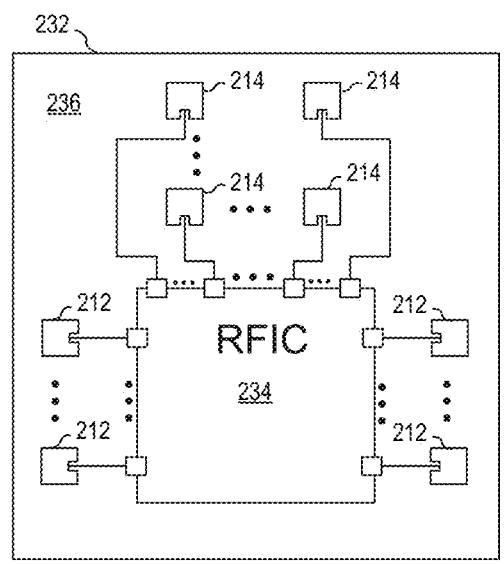

FIG. 2C illustrates a plan view of millimeter-wave radar sensor circuit 232 that includes an array of transmit antennas 212 and an array of receive antennas 214 coupled to RFIC 234 disposed on substrate 236. In various embodiments, transmit antennas 212 may form an array of m antennas and receive antennas 214 may form an array of n antennas. Each of the m transmit antennas 212 are coupled to a corresponding pin on RFIC 234 and coupled to a corresponding transmit circuit within RFIC 234; and each of the n receive antennas 214 are coupled to a corresponding pin on RFIC 234 and coupled to a corresponding receive circuit within RFIC 234. In various embodiments, the array of transmit antennas 212 and the array of receive antennas 214 may be implemented as a uniform array or a linear array of any dimension. It should be appreciated that the implementations of FIGS. 2B and 2C are just two examples of the many ways that embodiment millimeter-wave radar sensor circuits could be implemented.

Figure 3A:
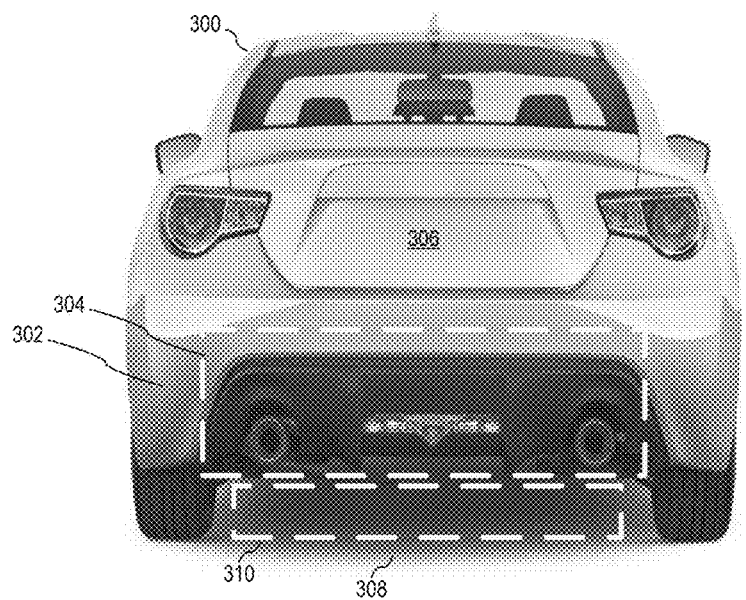
FIG. 3A shows a vehicle including a bumper that may include the millimeter-wave radar sensor systems of FIGS. 1 and 2A to 2C.

In general, the millimeter-wave radar sensor systems 100 or 200 may be integrated or covered by a bumper of a vehicle. The trunk or luggage compartment is most often located at the rear of the vehicle, and thus, in such vehicles, the millimeter-wave radar sensor systems 100 or 200 may be integrated or covered by the rear bumper of the vehicle. Other embodiments are possible where the millimeter-wave radar sensor systems 100 or 200 are integrated or covered by the front bumper of the vehicle. FIG. 3A shows an example of a vehicle 300 including a bumper 302 (e.g. a rear bumper) that may include the millimeter-wave radar sensor systems 100 or 200. The millimeter-wave radar sensor systems 100 or 200 may be located in a region 304 of the bumper 302 that is between the trunk 306 and the ground 308 over which the bumper 302 is located. The millimeter-wave radar sensor systems 100 or 200 may be sensitive to the motion of objects within a space 310 between the bumper 302 and the ground 308.

Figure 3B:
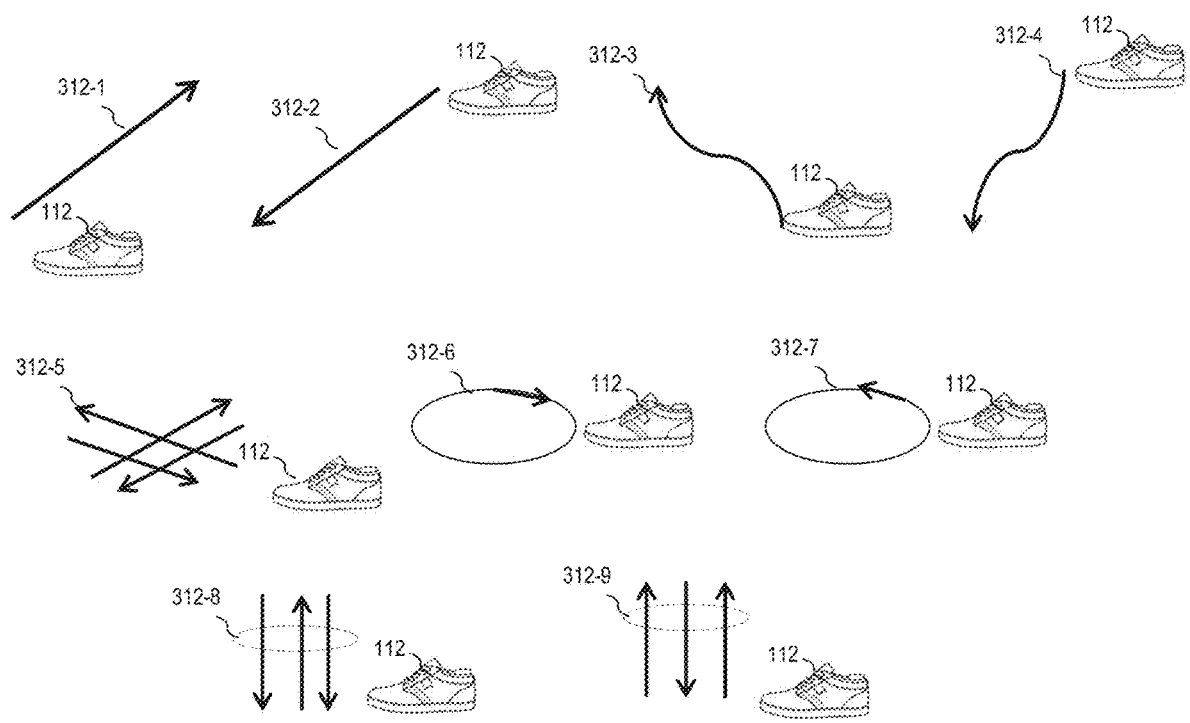
FIG. 3B shows examples of various trajectories that may be traced by the motion of a human foot.

FIG. 3B shows examples of various trajectories that may be traced by the motion of a human foot 112. As shown in FIG. 3B, the human foot 112 may be moved in a variety of ways, examples being: from left to right as the human foot 112 remains in the same horizontal plane during its motion (shown as trajectory 312-1); from right to left as the human foot 112 remains in the same horizontal plane during its motion (shown as trajectory 312-2); from right to left as the human foot 112 moves upwards as it moves from right to left (shown as trajectory 312-3); from right to left as the human foot 112 moves downwards as it moves from right to left (shown as trajectory 312-4); diagonally from left to right or from right to left (shown as trajectory 312-5); in a clockwise rotation (shown as trajectory 312-6); in an anti-clockwise rotation (shown as trajectory 312-7); a down-up-down motion as the human foot 112 remains in the same vertical plane during its motion (shown as trajectory 312-8); and an up-down-up motion as the human foot 112 remains in the same vertical plane during its motion (shown as trajectory 312-9). The various human foot patterns depicted in FIG. 3B may be detected by the system and method disclosed herein. Furthermore, one or more of the human foot patterns depicted in FIG. 3B may be associated with a particular response by the vehicle (thereby creating a human foot signature). The system and method disclosed herein may be configured to detect human foot patterns occurring in the space 310 between the bumper 302 and the ground 308, determine a human foot signature from the detected human foot patterns, associate the human foot signature with opening or closing the trunk of the vehicle, and cause the vehicle to appropriately respond to the determined human foot signature by opening or closing the trunk of the vehicle.

Figure 4C:
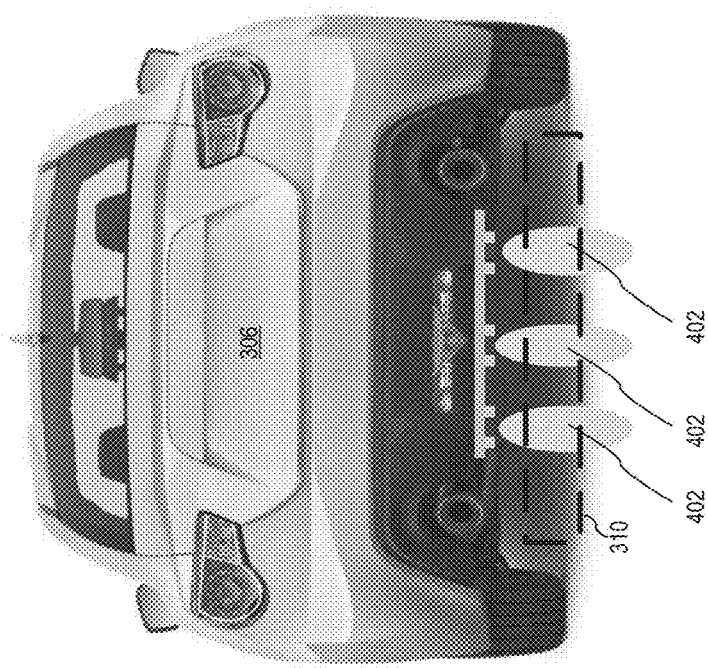
FIGS. 4A to 4C and 5A to 5C show examples where the millimeter-wave radar sensor systems of FIGS. 1 and 2A to 2C include a plurality of millimeter-wave radar sensor circuits disposed on a flat substrate.
Figure 4A:
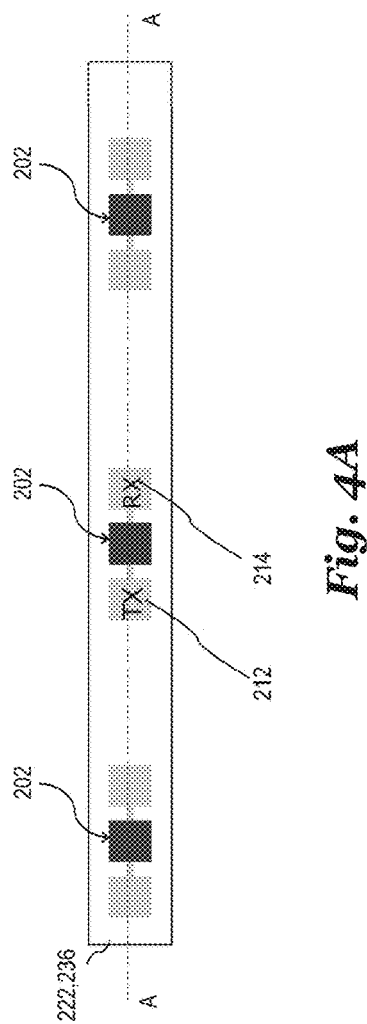
Figure 4B:
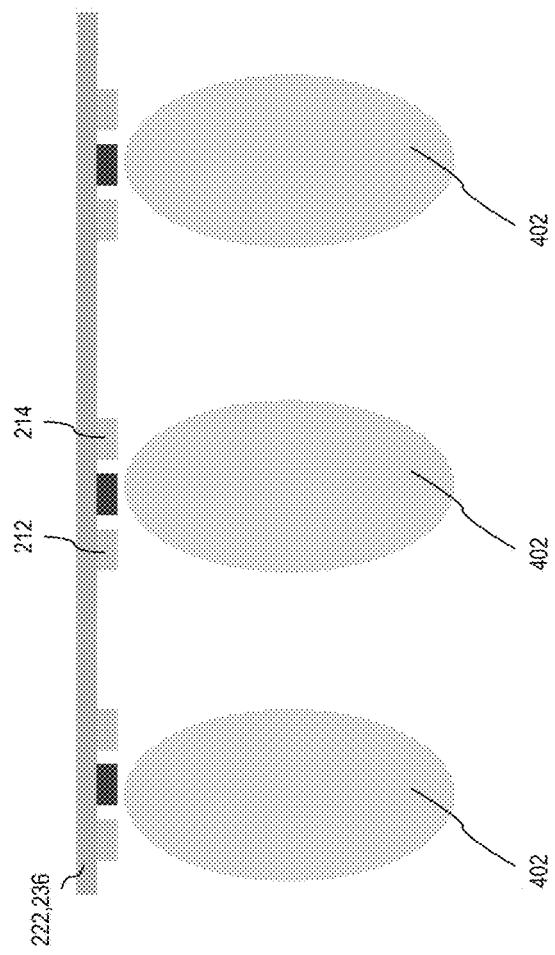

The millimeter-wave radar sensor system 200 may be configured in various ways. For example, as discussed above in reference to FIGS. 2A to 2C, the number of transmit antennas 212 and receive antennas 214 may vary in various embodiments and the millimeter-wave radar sensor circuit 202 may operates as a FMCW radar circuit, a continuous wave radar circuit, a fixed beam radar circuit, a pulse radar circuit, a MCFW radar circuit, or a NLFM radar circuit. FIGS. 4A to 4C show an example where the millimeter-wave radar sensor system 200 includes a plurality of millimeter-wave radar sensor circuits 202 disposed on a flat substrate 222, 236. Each millimeter-wave radar sensor circuit 202 includes one transmit antenna 212 and one receive antenna 214 and operates as a continuous wave radar circuit. Each of the millimeter-wave radar sensor circuits 202 projects a beam 402 into the space 310. Thus, the space 310 within which the human foot 112 is placed and moved is populated by a plurality of beams 402. The interaction of the human foot 112 with the plurality of beams 402 enables the millimeter-wave radar sensor system 200 to determine the trajectory traced by the motion of the human foot 112 (e.g. and to determine whether the human foot 112 is being moved from right to left or from left to right). FIG. 4A illustrates a top-down or plan view of the millimeter-wave radar sensor system 200, which shows three millimeter-wave radar sensor circuits 202 arranged as a linear array on the flat substrate 222, 236. As mentioned above, each millimeter-wave radar sensor circuit 202 of FIG. 4A includes one transmit antenna 212 and one receive antenna 214. While three millimeter-wave radar sensor circuits 202 are shown in the example of FIG. 4A, it is noted that in some embodiments, the number of millimeter-wave radar sensor circuits 202 may be different, and in general, the number of millimeter-wave radar sensor circuits 202 in the linear array of FIG. 4A may be increased to increase the precision to which the trajectory traced by the motion of the human foot 112 is tracked. The number of millimeter-wave radar sensor circuits 202 in the linear array of FIG. 4A may also be varied based on the beam pattern desired in the space 310, which may be related to the precision to which the trajectory traced by the motion of the human foot 112 is tracked. For example, low-precision trajectory tracking may be sufficient to trace trajectories 312-1, 312-2, 312-8, and 312-9, while higher-precision trajectory tracking may be needed for the other trajectories depicted in FIG. 3B. FIG. 4B shows a cross-sectional view of the millimeter-wave radar sensor system 200 shown in FIG. 4A, taken along a line A-A. FIG. 4C shows the placement of the millimeter-wave radar sensor system 200 within the region 304 of the bumper 302.

Figure 5C:
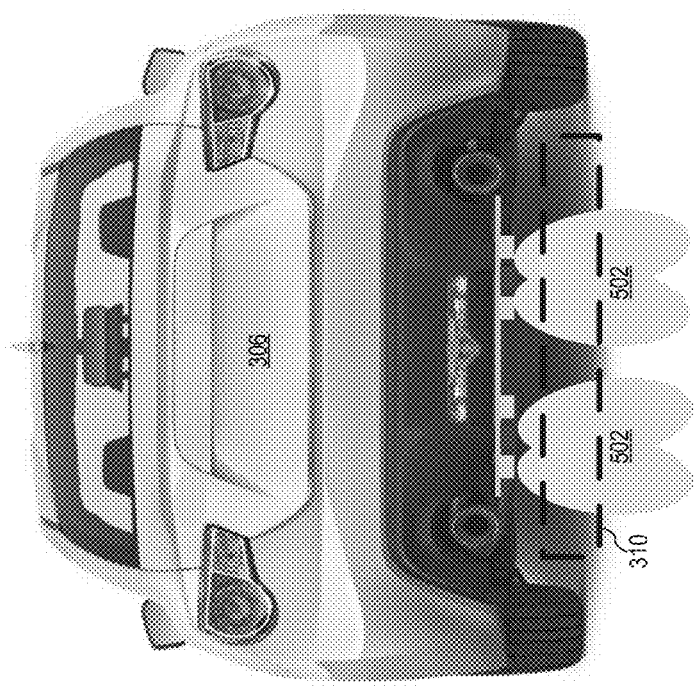
Figure 5A:
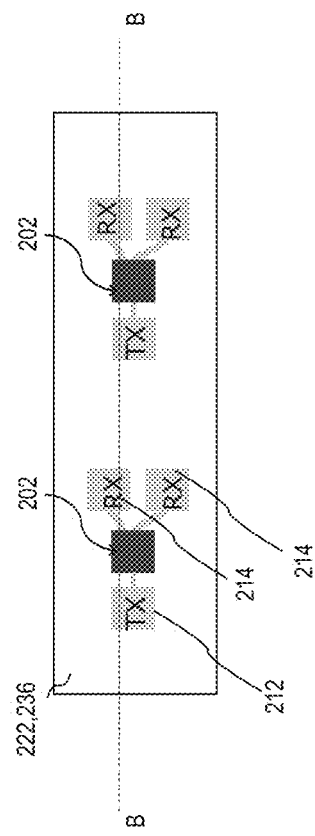
Figure 5B:
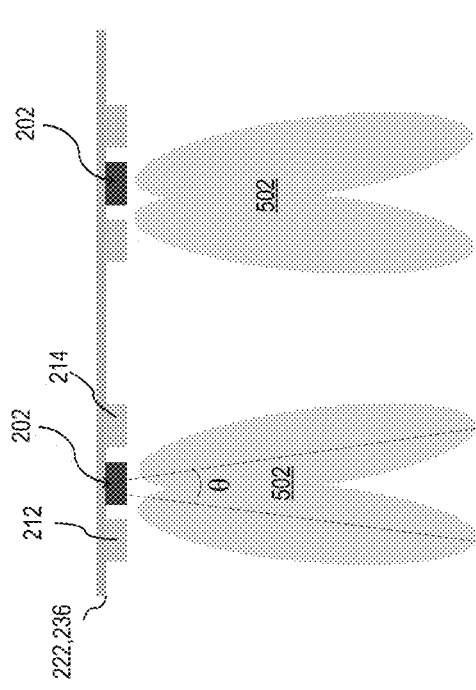

FIGS. 5A to 5C show another example where the millimeter-wave radar sensor system 200 includes the plurality of millimeter-wave radar sensor circuits 202 disposed on a flat substrate 222, 236. Each millimeter-wave radar sensor circuit 202 includes one transmit antenna 212 and two receive antennas 214 and operates as an FMCW radar circuit. Receiver beamforming is accomplished in each of the millimeter-wave radar sensor circuits 202, where signals are received simultaneously from different directions. In this regard, each millimeter-wave radar sensor circuit 202 may be associated with a respective beam group 502. The beam group 502 for a respective millimeter-wave radar sensor circuit 202 may span an azimuth of θ degrees. In some embodiments, the azimuth θ may be between about 70 degrees and 90 degrees (e.g. about 80 degrees), although other azimuths may be possible in other embodiments. Thus, the space 310 within which the human foot 112 is placed and moved is populated by the plurality of beam groups 502. The interaction of the human foot 112 with the plurality of beams 402 enables the millimeter-wave radar sensor system 200 to determine the trajectory traced by the motion of the human foot 112 (e.g. and to determine whether the human foot 112 is being moved from right to left or from left to right). FIG. 5A illustrates a top-down or plan view of the millimeter-wave radar sensor system 200, which shows two millimeter-wave radar sensor circuits 202 arranged as a linear array on the flat substrate 222, 236. As mentioned above, each millimeter-wave radar sensor circuit 202 of FIG. 5A includes one transmit antenna 212 and two receive antennas 214. While two millimeter-wave radar sensor circuits 202 are shown in the example of FIG. 5A, it is noted that in some embodiments, the number of millimeter-wave radar sensor circuits 202 may be different, and in general, the number of millimeter-wave radar sensor circuits 202 in the linear array of FIG. 5A may be increased to increase the precision to which the trajectory traced by the motion of the human foot 112 is tracked, as discussed above in reference to FIGS. 4A to 4C. FIG. 5B shows a cross-sectional view of the millimeter-wave radar sensor system 200 shown in FIG. 5A, taken along a line B-B. FIG. 5C shows the placement of the millimeter-wave radar sensor system 200 within the region 304 of the bumper 302.

FIGS. 6A to 6C show another example where the millimeter-wave radar sensor system 200 includes a single millimeter-wave radar sensor circuit 202 disposed on a curvilinear substrate 222, 236. The millimeter-wave radar sensor circuit 202 shown in FIG. 6A includes one transmit antenna 212 and two receive antennas 214 and operates as a fixed beam radar circuit. In comparison to the embodiment shown in FIGS. 5A to 5C, the transmit antenna 212 of FIG. 6A is disposed between the receive antennas 214. In this embodiment, the beam 602 associated with each respective receive antenna 214 may be facing in different or opposite directions. The interaction of the human foot 112 with the plurality of beams 602 enables the millimeter-wave radar sensor system 200 to determine the trajectory traced by the motion of the human foot 112 (e.g. and to determine whether the human foot 112 is being moved from right to left or from left to right). FIG. 6A illustrates a top-down or plan view of the millimeter-wave radar sensor system 200, which shows one millimeter-wave radar sensor circuit 202 arranged on the curvilinear substrate 222, 236. While one millimeter-wave radar sensor circuit 202 is shown in the example of FIG. 6A, it is noted that in some embodiments, the number of millimeter-wave radar sensor circuits 202 may be different, and in general, the number of millimeter-wave radar sensor circuits 202 used in the system of FIG. 6A may be increased to increase the precision to which the trajectory traced by the motion of the human foot 112 is tracked, as discussed above in reference to FIGS. 4A to 4C. FIG. 6B shows a cross-sectional view of the millimeter-wave radar sensor system 200 shown in FIG. 6A, taken along a line C-C. FIG. 6C shows the placement of the millimeter-wave radar sensor system 200 within the region 304 of the bumper 302.

Figure 7A:
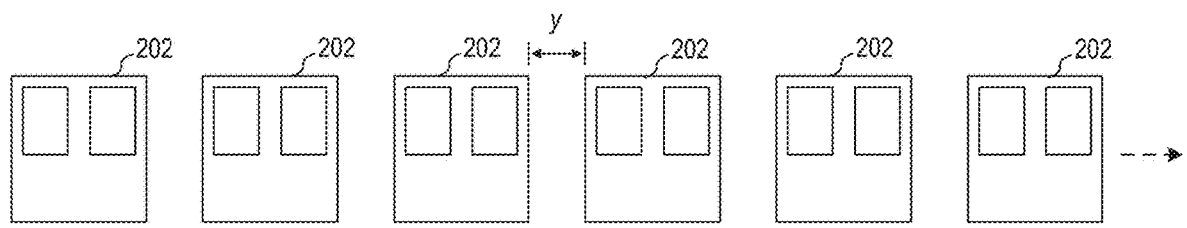
FIGS. 7A to 7D illustrate various configurations for the placement of millimeter-wave radar sensors within a bumper of a vehicle.
Figure 7B:
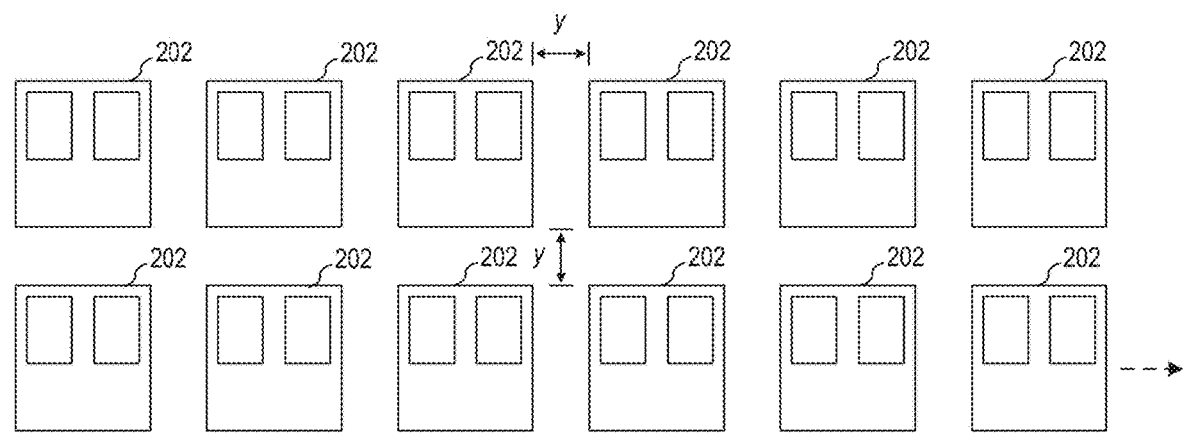
Figure 7C:
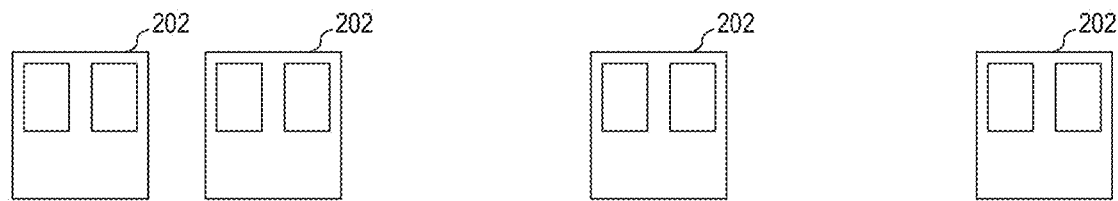
Figure 7D:
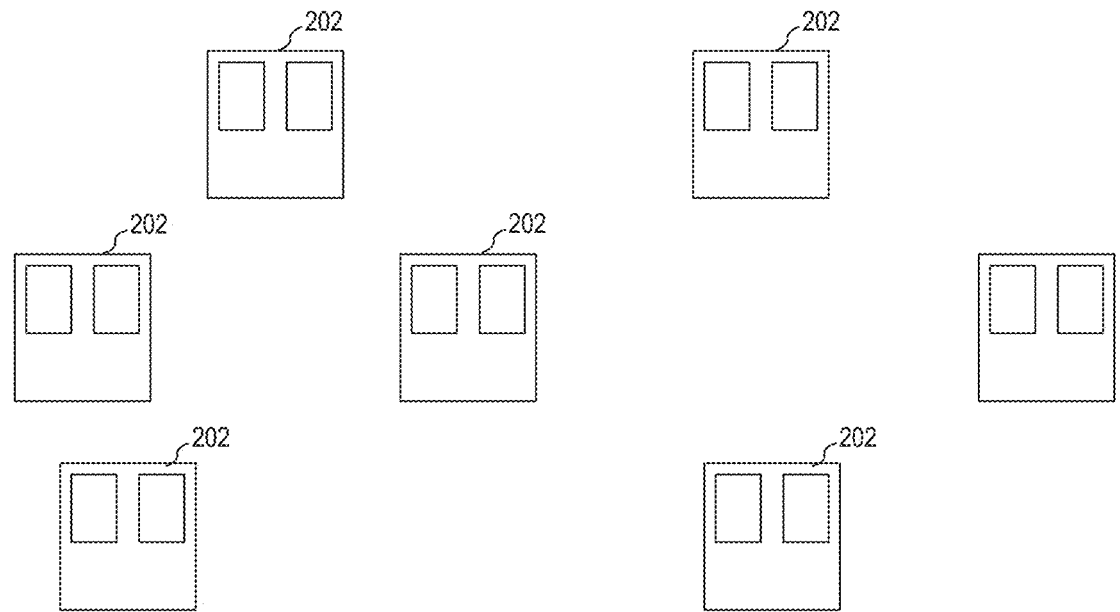

FIGS. 7A to 7D illustrate various configurations for the placement of millimeter-wave radar sensors 202 within the bumper 302 of the vehicle 300. FIG. 7A illustrates millimeter-wave radar sensor circuits 202 configured in a uniform linear array with a distance y between each sensor. Such a uniform linear array is depicted in the embodiments of FIGS. 4A to 4C and 5A to 5C. While six millimeter-wave radar sensor circuits 202 are shown in the illustration, it should be understood that greater or fewer than six millimeter-wave radar sensor circuits 202 may be used depending on the specific embodiment and its specifications. FIG. 7B illustrates millimeter-wave radar sensor circuits 202 configured in a uniform rectangular array with a distance y between each sensor. While an array of 2×6 millimeter-wave radar sensor circuits 202 is shown in the illustration, it should be understood that any rectangular array dimension may be used depending on the specific embodiment and its specifications. Configuring millimeter-wave radar sensor circuits 202 in a rectangular configuration helps to improve cross-range resolution. In various embodiments, the range of the radar system is a distance between the sensor 202 and the human foot 112, while the cross-range of the resolution pertains to a spatial resolution within a sensing place of radar sensor circuits 202. Millimeter-wave radar sensor circuits 202 may also be implemented in a non-uniform configuration. For example, FIG. 7C illustrates millimeter-wave radar sensor circuits 202 configured in a non-uniform linear array, and FIG. 7D illustrates millimeter-wave radar sensor circuits 202 configured in a non-uniform two-dimensional array. In various embodiments, millimeter-wave radar sensor circuits 202 have a minimum distance of between $0.5\lambda$ and $0.7\lambda$ between each other where X is the wavelength of the millimeter-wave RF signal. This distance between millimeter-wave radar sensor circuits 202 may be increased when the position of each sensor is known for processing extracted data.

In various embodiments, in order to ensure that millimeter-wave radar sensor circuits 202 may radiate and receive radar signals, millimeter-wave radar sensors 202 may be mounted on a variety of surfaces and may be hidden under different materials and/or radome types that include, for example, polycarbonate, glass, plastics and other materials. In some embodiments, metals are not used above the sensor system. In other embodiments, metals may be used above the sensor plane as a shield or a waveguide depending on the particular system. For example, a Yagi antenna disposed on the substrate of millimeter-wave radar sensor 202 may be used to transmit or receive a signal in the same plane as the sensor. In such a case, the antenna may be rotated by 90 degrees such that beam produced by the radar sensor is directed toward the target. A metal shield may be disposed above the antenna. In some cases, the power levels transmitted by millimeter-wave radar sensors 202 may be limited to comply with government regulations, such as regulations promulgated by the United States Federal Communications Commission (FCC). In some embodiments, any uniform linear array (ULA), non-uniform linear array (NULA), uniform rectangular array (URA) or non-uniform rectangular array (NURA) can be used depending on resolution requirements, power consumption, system space available etc.

Figure 8:
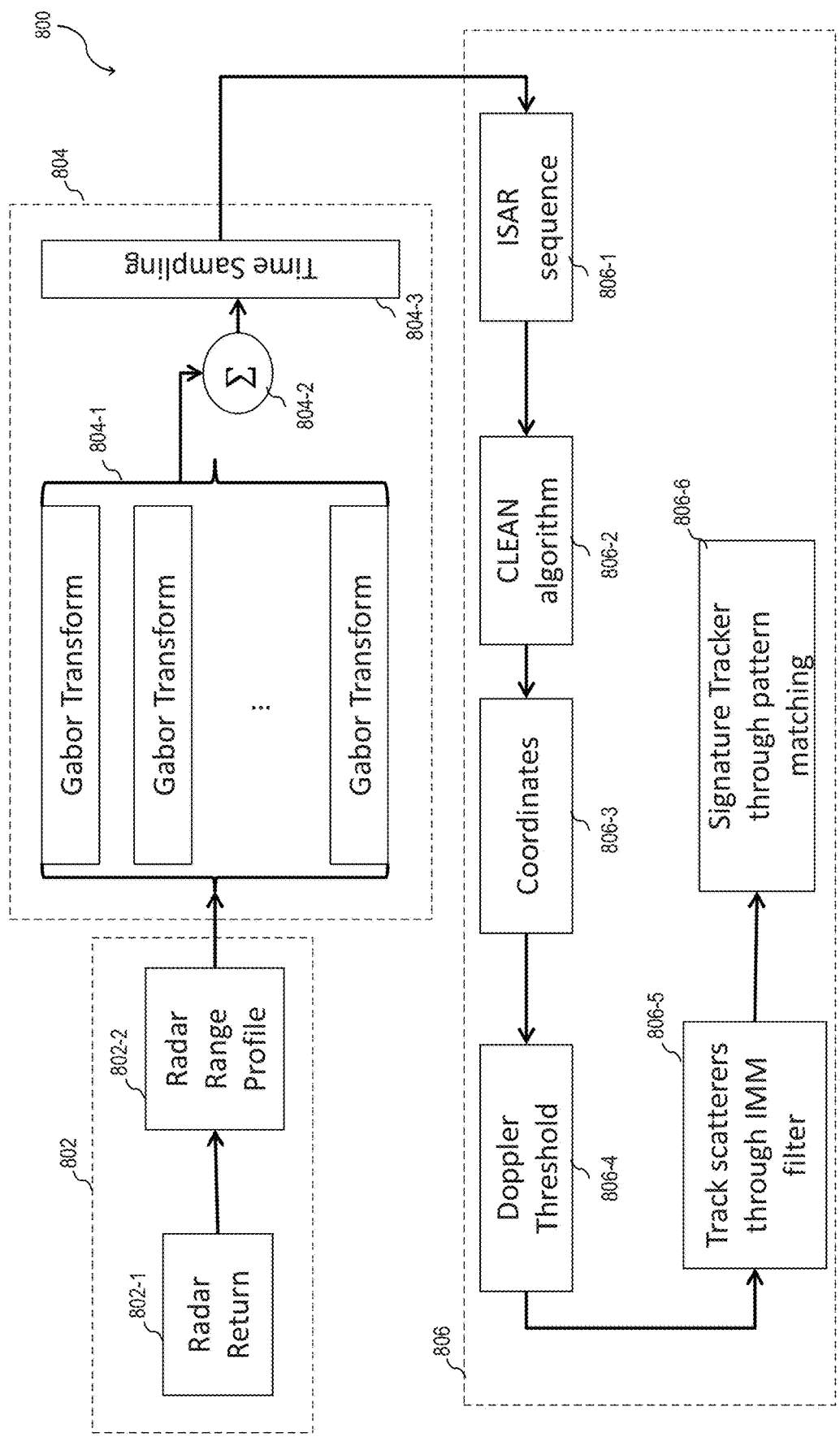
FIG. 8 shows a method of detecting motion, tracking the trajectory traced by the motion, and determining whether the trajectory corresponds to a human foot signature that is associated with opening or closing a trunk of a vehicle, in accordance with an embodiment.

FIG. 8 shows a method 800 of detecting motion, tracking the trajectory traced by the motion, and determining whether the trajectory corresponds to a human foot signature that is associated with opening or closing the trunk 306 of the vehicle 300, in accordance with an embodiment. The method 800 includes a data acquisition step 802, a data preparation step 804, and a prediction step 806. The data acquisition step 802 includes reception of radar data (in step 802-1) and the generation of a radar range profile based on the received radar data (in step 802-2). The steps 802-1 and 802-2 are illustrated as a simplification of the data acquisition step 802. A more detailed depiction of the data acquisition step 802 is shown in FIG. 9.

Figure 9:
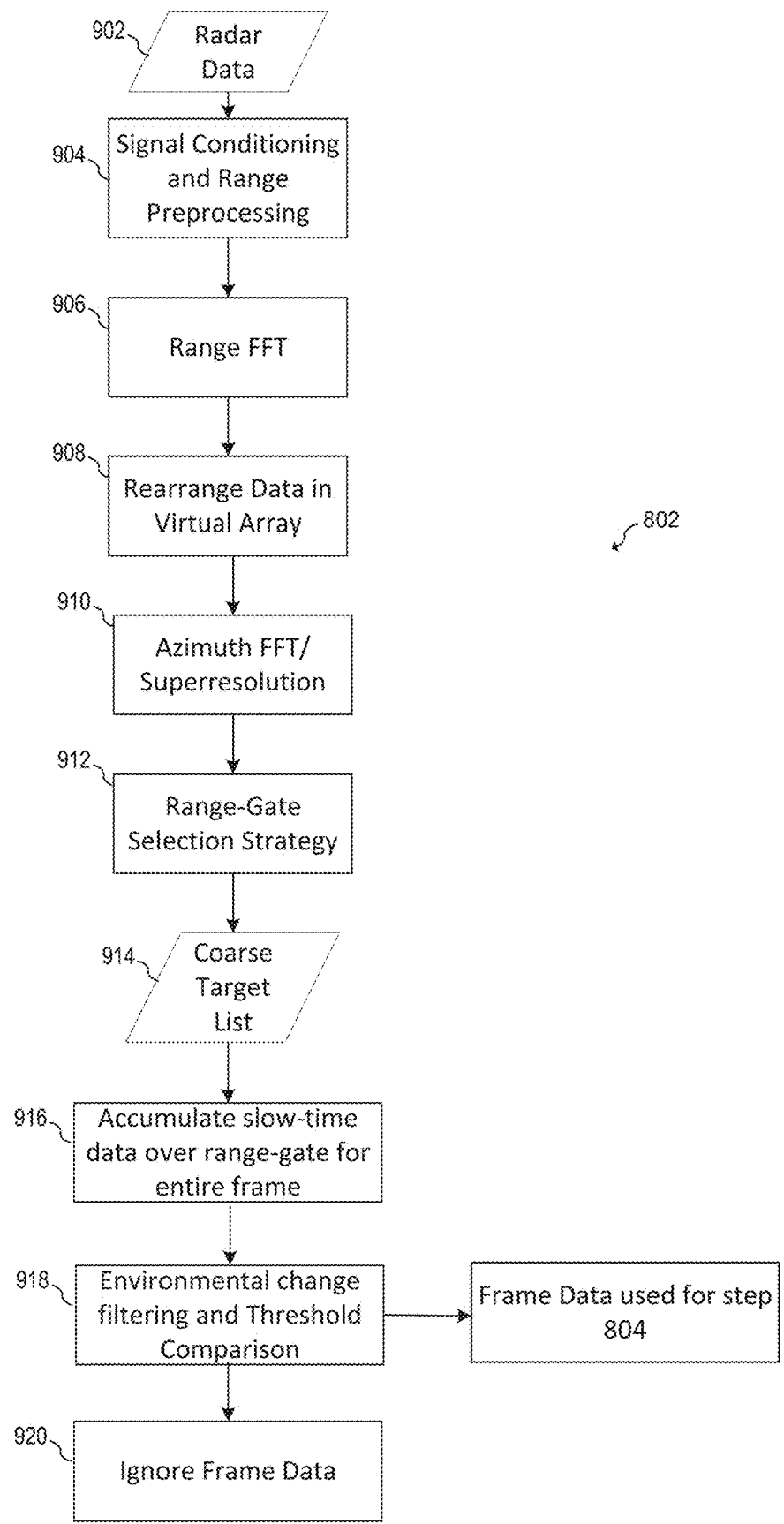
FIG. 9 shows, in greater detail, a data acquisition step of the method shown in FIG. 8, in accordance with an embodiment.

FIG. 9 shows, in greater detail, the data acquisition step 802 of the method 800 shown in FIG. 8, in accordance with an embodiment. The data acquisition step 802 includes reception of digital radar data (in step 902) by the millimeter-wave radar sensor. To obtain the digital radar data, a series of chirps is transmitted and subsequently received by a millimeter-wave radar sensor, such as millimeter-wave radar sensors 102, 202, 220 and 232 shown in FIGS. 1, 2A, 2B and 2C, respectively. These radar measurements, which can include baseband beat frequencies, are digitized and stored as digital radar data. In step 904, signal conditioning and range preprocessing is performed. During step 904, digital radar data is filtered, DC components are removed, and the IF data is cleared. In some embodiments, IF data is cleared by filtering to remove the Tx-Rx self-interference and optionally pre-filtering the interference colored noise. In some embodiments, filtering includes removing data outliers that have significantly different values from other neighboring range-gate measurements. In a specific example, a Hampel filter is applied with a sliding window at each range-gate to remove such outliers. Alternatively, other filtering for range preprocessing known in the art may be used. In step 906, a range FFT is taken of the filtered radar data produced by step 904. Each point of the range FFT represents a distance between the millimeter-wave sensor and a detected object and corresponds to a range gate. In some embodiments, a range FFT is performed for radar data produced by each receive antenna in a receive antenna array.

In step 908, the data produced by range FFT step 906 is rearranged in a virtual array. Here, multiple receiver data is stitched together for improved angular resolution using methods known in the art. In step 910, an azimuth FFT is performed on the virtual array data produced in step 908 using higher order beamforming and super-resolution techniques known in the art. In various embodiments, the range FFT provides an indication as to the angular location of the detected objects with respect to the position of the millimeter-wave radar sensor. In alternative embodiments, other transform types could be used besides an FFT for the range and azimuth FFTs of steps 906 and 910, such as a Discrete Fourier Transform (DFT) or other transform types such as a z-transform.

In step 912, a range-gate selection strategy is implemented, according to methods known in the art, to determine which range-gates represent detected objects. In some embodiments, range-gates whose mean is greater than the mean of all the other range gates in its field of view are selected as potential target range-gates. In various embodiments, the range-gate selection strategy also determines the angle or azimuth of detected targets with respect to the millimeter-wave radar sensor as well as their range or distance to the millimeter-wave radar sensor. Once it is determined which range gates represent detected objects, a coarse target list is produced (e.g. in step 914) that includes the range and azimuth of each detected object.

The method shown in FIG. 9 also includes step 916, where slow-time data corresponding to a selected range-gate is captured across an entire Doppler frame (e.g. macro-Doppler frame). In some embodiment, during transmission, an entire Doppler frame includes a continuous sequence of transmitted chirps followed in time by a transmission-free duration. The continuous sequence of transmitted chirps may include 16 consecutive chirps, each having a period of 32 microseconds. Consequently, the continuous sequence of transmitted chirps of the Doppler frame is 512 microseconds in duration. The transmission-free duration may last for about 448 microseconds, thereby causing each Doppler frame to have a duration of about 960 microseconds. Based on these time durations, the method 800 may be capable of detecting a maximum Doppler frequency of 31.25 kHz with a 1.953 kHz frequency resolution. It is noted that these time durations are merely exemplary and may be different in other embodiments.

In some embodiments, following step 916, environmental change filtering is performed on the Doppler frame (in step 918). In an embodiment, a threshold-based approach is used to determine whether or not the segment of range-gate window measurements contains movement or environmental changes by examining the short-time energy of the moving variance of the range-gate. This variance energy may be empirically calculated in some embodiments. Range-gate measurements that fall below the threshold established by the short-time energy of the moving variance of the range-gate are considered to be representative of static objects, and thus such frame data is ignored (in step 920). On the other hand, range-gate measurements that are above the threshold are considered to be representative of a movement or motion being present in the corresponding range-bin, and thus used in the data preparation step 804 of the method 800.

Referring back to FIG. 8, the data acquisition step 802 generates a time-domain Doppler signal that is provided to the data preparation step 804. The data preparation step 804 functions as a preprocessing step that improves a Doppler signature (e.g. in terms of signal-to-noise ratio) so that an accurate prediction may be made in the prediction step 806. As shown in FIG. 8, the data preparation step 804 may include a filtering step 804-1, which in the example of FIG. 8, is implemented using a Gabor transform. The Gabor transform localizes signals in time and frequency and use of Gabor functions advantageously provides the ability to analyze a time domain signal over a particular period of time. This is to be contrasted with standard Fourier transforms, which analyze a signal over all time (i.e. for an infinite duration) and has localization in frequency but no localization in time. In FIG. 8, the Gabor transform step 804-1 may be include a plurality of parallel Gabor transformations being executed on the time-domain Doppler signal that is provided to the data preparation step 804.

Each respective Gabor transformation step of the plurality of parallel Gabor transformations may include a step of generating a windowed time-frequency signal from the time-domain Doppler signal and subjecting the windowed time-frequency signal to the Gabor time-frequency transform in accordance with methods known in the art. The windowed time-frequency signal may be generated by convolving (in the time-domain), the time-domain Doppler signal (received from step 802) with a window function that is localized in time and frequency. The localized window function may be different for each respective Gabor transformation step of the plurality of parallel Gabor transformations. Some examples of window functions include rectangular, triangular, Hanning, Hamming, Gaussian, and Blackman windows. Localization in time of the window function may be achieved by translating the window, in time, by a specific time delay, while localization in frequency of the window function may be achieved by multiplying the window with a complex exponential having a specific angular frequency. The specific time delay and the specific angular frequency may be different for each respective Gabor transformation step of the plurality of parallel Gabor transformations. Following the filtering step 804-1, the result of the filtering step 804-1 is combined (e.g. by an adding step 804-2 that generates an aggregate of the results of the plurality of parallel Gabor transformation steps). The result of the combination is subsequently sampled in time (in step 804-3).

The result of the data preparation step 804 is then subjected to the prediction step 806, as shown in FIG. 8. The prediction step 806 may include generating a sequence of inverse radar with synthetic aperture (ISAR) images (in step 806-1) from the result of the data preparation step 804, according to methods known in the art. In general, ISAR is a technique used to obtain high resolution radar images of a moving target (e.g. the object 112 and/or 114), and, in particular, of a periodically moving target (such as, for example, a human foot being moved under a vehicle's bumper repeatedly). The resolution provided by the ISAR images may be superior to the diffraction-limited resolution of the physical aperture used because, in an ISAR sequence of images, a synthetic aperture may be formed by combining radar returns received from the target (e.g. object 112 and/or 114) at various target angles that is significantly larger than the physical aperture. In general, an ISAR-based processing step may use the Doppler shift of the return signals received from points on the target to infer the range velocity of the points, from which, assuming that the target is moving as a rigid body (which is generally true for the human foot), the relative distance of points from the axis of rotation, in a direction perpendicular to the radar beam may be inferred.

The sequence of ISAR images generated in step 806-1 is then subjected to a CLEAN algorithm (in step 806-2) that filters and removes artifacts from the ISAR sequence of images, according to methods known in the art. The CLEAN algorithm may iteratively deconvolve the ISAR sequence of images and, in the process of such iterative deconvolution, selects a brightest target from among the reflected signals and moves the target peaks to a "clean" image with no noise background. The side lobes or artifacts from the target are then deconvolved to reveal a next brightest target, and the foregoing process continues until all of the desired targets have been distinguished from the reflected signals. Artifacts in the ISAR sequence of images may be caused by both auto-correlation and cross-correlation.

The prediction step 806 further includes mapping the result of step 806-2 onto a common coordinate system (in step 806-3). The mapping step 806-3 may generate a range-Doppler map and may be necessary since, as discussed above in reference to FIGS. 4A to 4C, 5A to 5C, 6A to 6C, and 7A to 7D, the millimeter-wave radar sensor system 200 may include a plurality of millimeter-wave radar sensor circuits 202, and the data obtained from each of the plurality of millimeter-wave radar sensor circuits 202 may correspond to different coordinates. For example, millimeter-wave radar sensor circuits 202 at different positions may receive and generate signals ate different coordinates and the different coordinates from the plurality of millimeter-wave radar sensor circuits 202 are mapped onto a common coordinate system.

Figure 10:
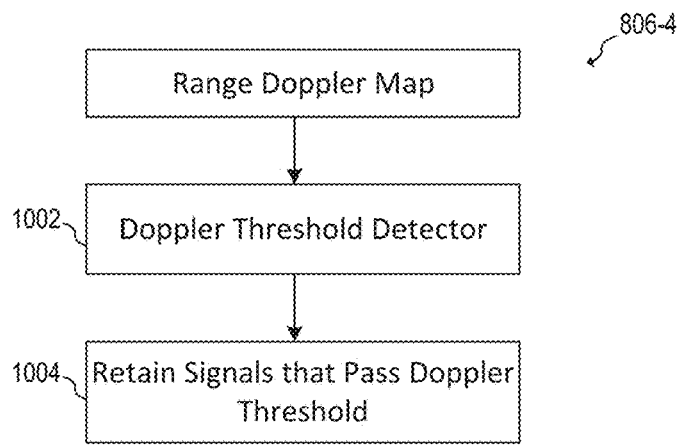
FIG. 10 shows, in further detail, the steps included in a Doppler thresholding step of the method shown in FIG. 8, in accordance with an embodiment.

The prediction step 806 further includes a Doppler thresholding step (in step 806-4). The Doppler threshold employed in step 806-4 may be chosen based on convolution of the range-Doppler map from step 806-3 with an appropriate kernel. FIG. 10 shows, in further detail, the steps included in the Doppler thresholding step 806-4 of method 800. As shown in FIG. 10, in step 1002, the range-Doppler map is convolved with a reference point spread function. In some embodiments, the reference point spread function may be a two-dimensional Gaussian filter. The magnitude of the result of the convolution is then compared against a Doppler threshold and signals that are at least equal to the Doppler threshold are retained (in step 1004). In general, the convolution in step 1002 may be expressed as $z(u,v) = \sum_{m=1}^{M} \sum_{n=1}^{N} x(m+u,n+v) * p(m,n)$, where $p(m,n)$ is the reference point spread function, $x(m,n)$ is the range-Doppler map from step 708, and M and N are the number of range bins and the number of Doppler frequency ranges, respectively. The comparison of the magnitude of the result of the convolution to the Doppler threshold may be expressed as $|z(u,v)| \geq \eta 1$.

Figure 11:
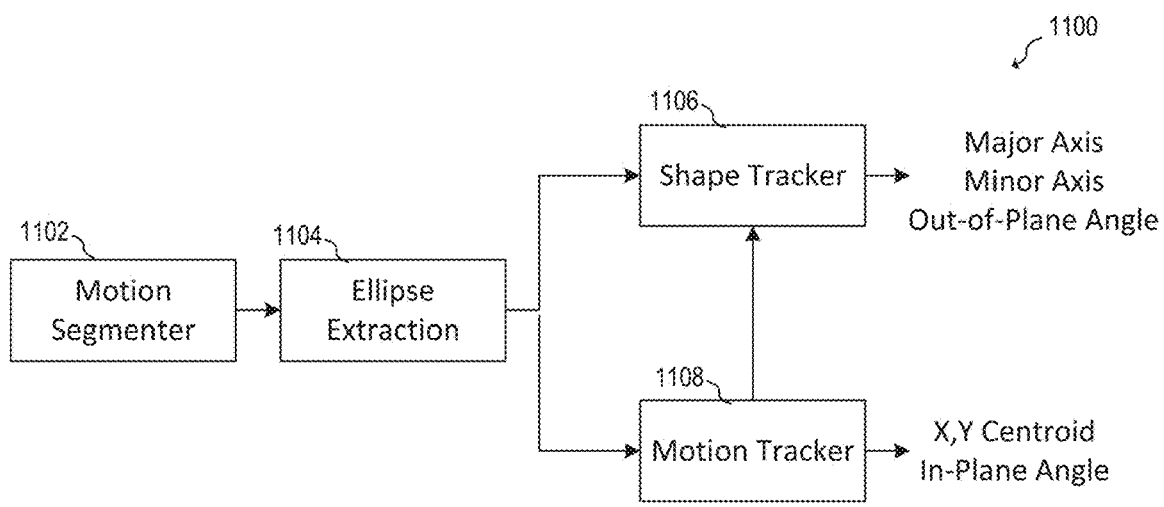
FIG. 11 shows a processing system for supporting an interactive multiple model filtering and tracking step of the method shown in FIG. 8, in accordance with an embodiment.

Referring back to FIG. 8, the result of the Doppler thresholding step 806-4 may reveal possible target scatterers, and the step 806-5 is then executed, which tracks the motion of the target scatterers through the use of an interactive multiple model (IMM) filter. FIG. 11 shows a processing system 1100 for supporting the IMM filtering and tracking step 806-5, in accordance with an embodiment. As shown in FIG. 11, there may be two paths for tracking the motion of the target scatterers: one for tracking shape (e.g. implemented by shape tracker 1106), and the other for tracking motion (e.g. implemented by motion tracker 1108). In some embodiments, the shape tracker 1106 may be omitted.

The system 1100 includes a motion segmenter 1102 and an ellipse extraction module 1104 that determines a centroid (x,y) coordinates, the major and minor axes, and the in-plane rotation β. These parameters serve as the input vectors for the shape tracker 1106 and the motion tracker 1108, as shown in FIG. 11. With regards to the shape tracker 1106, the basic model equations for a linear Kalman filter may be expressed as:

$$x(k) = \Phi(k-1) * x(k-1) + v(k-1)$$

$$z(k) = M(k) * x(k) + w(k),$$

where Φ is the state transition matrix, x is the state vector, v is the process noise, z is the measurement value, M is the measurement matrix, and w is the measurement noise. The actual state estimation and prediction equations are given as:

$$x(k|k-1)==\Phi(k-1)*x(k-1|k-1)$$

$$x(k|k)=x(k|k-1)+G(k)*\text{residue}(k)$$

$$\text{residue}(k)=z(k)-M(k)*x(k-k-1)$$

$$S(k)=M(k)P(k|k-1)M(k)^T+R(k),$$

where residue(k) is the measurement residue, a Gaussian random variable with mean zero and covariance S(k), and R(k) is the covariance of the measurement noise w.

The equations for the filter gain, G, and the covariance matrix, P, of the state prediction are then:

$$G(k)=P(k|k-1)M(k)^T*(M(k)*P(k|k-1)*M(k)^T+R(k)^{-1}$$

$$P(k|k-1)=\Phi(k-1)P(k-1|k-1)*\Phi(k-1)+Q(k-1),$$

where Q(k) is the covariance of the process noise v, M(k) is the measurement matrix from the above equations, and $\Phi(k)$ is the state transition matrix from the above equations.

Figure 12:
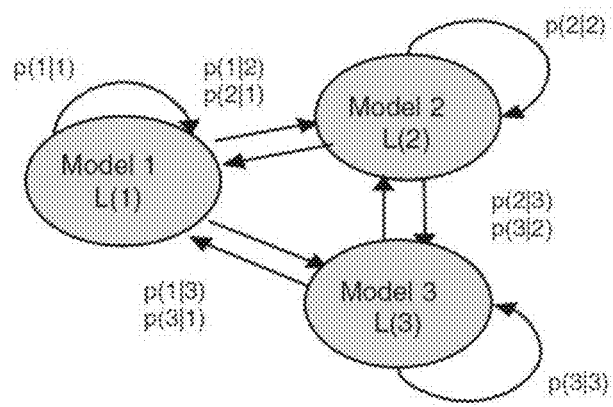
FIG. 12 shows an interaction between models that depends on switching probabilities and likelihoods of each of the models, in accordance with an embodiment.

For the IMM implementation, there is effectively a complete set of the above equations for each model (e.g. where each model may correspond to a particular human foot pattern). The interaction between the models depends on the switching probabilities p(1|1), n(1|2), n(2|1), n(2|2), n(2|3), n(3|2), p(3|3), p(1|2) and p(2|1), and the likelihoods of each of the models as shown in FIG. 12. Only three models L(1), L(2) and L(3) are shown in FIG. 12 for the purposes of illustration; other number of models may be possible in other embodiments. The likelihoods are generated according to:

$$x_{0m}(k-1|k-1) = \sum_{s=1}^{N} x_s(k-1|k-1)*f_{s|m}(k-1)$$

$$f_{y|m}(k-1) = \frac{1}{\sum_{s=1}^{N} p(s|m)*f_s(k-1)} * p(s|m)*f_s(k-1)$$

$$f_m(k) = \frac{1}{\sum_{s=1}^{N} L_s(k)*\sum_{t=1}^{N} p(t|s)*f_t(k-1)} * L_m(k)*\sum_{s=1}^{N} p(s|t)*f_s(k-1)$$

$$L_m(k) = N|[\text{residue}_m(k); 0, S_m(k)],$$

where $f_{s|m}(k-1)$ is the probability of model s being correct at time k−1, given that model m is correct at time k; $f_{s|m}(k-1)$, $f_m(k)$ are the model probabilities at times k−1 and k, respectively; $L_m(k)$ is the likelihood of the model m at time k based on the residue from the incoming measurement. It is noted that N[x;μΣ] represents a normal distribution with an argument x, mean μ, and covariance Σ. The final output of the system is a combined state vector that is the sum of the state vectors for each of the modes weighted by their model probabilities.

With regards to the motion tracker 1108, the motion tracker 1108 processes the centroids of the targets 112, 114 as well as the in-image plane rotation angle β. The key may be to define the models (e.g. where each model may correspond to a particular human foot pattern) as a set of states that can be represented by unique noise parameters. From the model probabilities, dynamics between two states may be determined by observing the relative probabilities. By characterizing the model probabilities for sets of scatterers, it is possible to train a back-end classifier to recognize even more complicated dynamics by treating the underlying models as a basis function upon which other dynamics are built. Referring back to FIG. 8, in step 806-6, it is determined (e.g. by a processor) whether the trajectory of motion tracked in step 806-5 corresponds to a human foot signature associated with opening or closing the trunk 306 of the vehicle 300. Such a determination may be made based on pattern matching.

Figure 13:
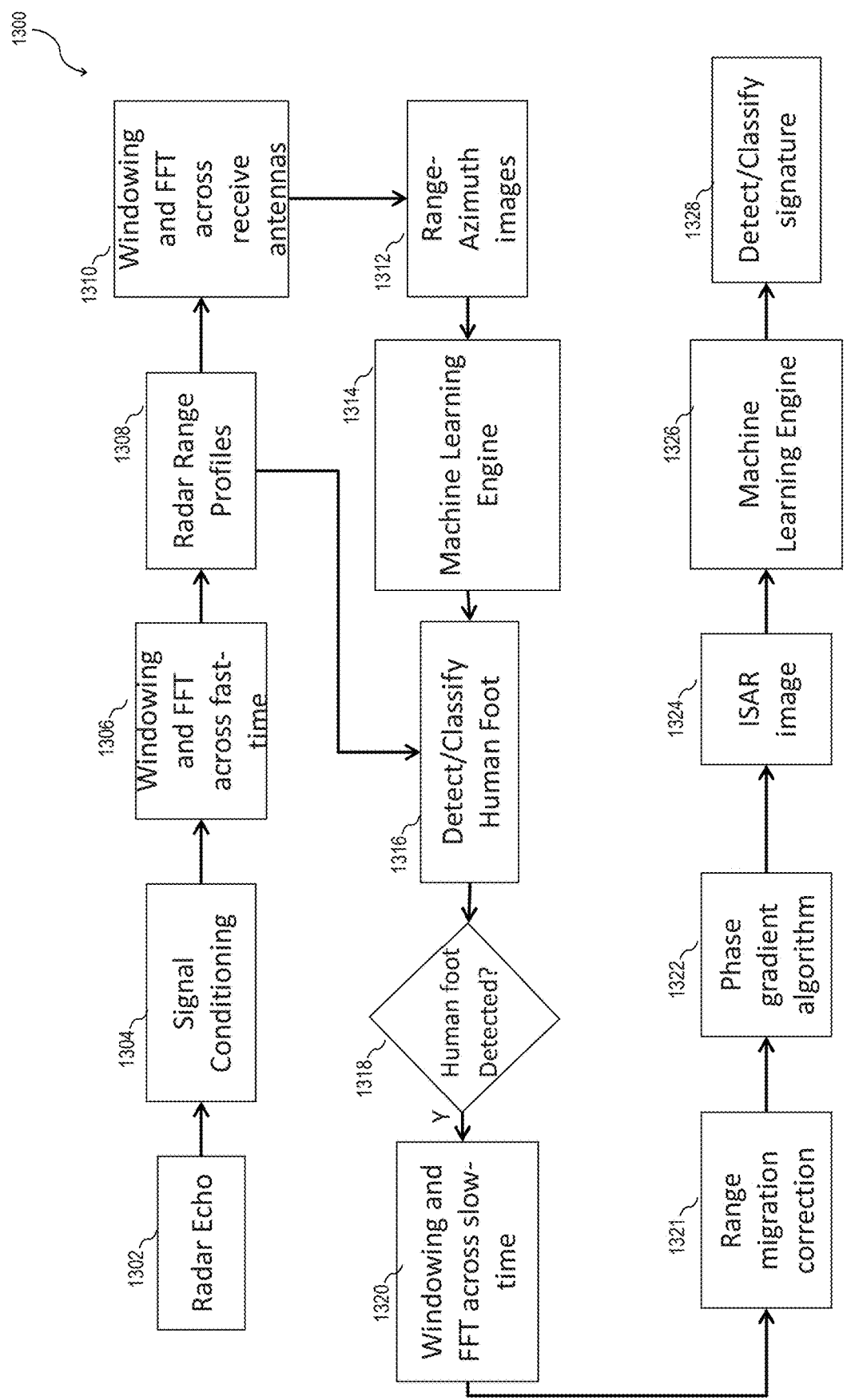
FIG. 13 shows a method of determining whether a human foot is present within a space between a vehicle's bumper and the ground, and, if so, tracking the trajectory traced by the motion of the human foot, in accordance with an embodiment.

FIG. 13 shows a method 1300 of determining whether a human foot is present within the space 310 between the bumper 302 and the ground 308, and, if so, tracking the trajectory traced by the motion of the human foot, in accordance with an embodiment. In comparison with the method 800o shown in FIG. 8 (where motion is detected, tracked, and subsequently matched to a human foot signature), the method 1300 shown in FIG. 13 first determines whether a human foot is present within the space 310 between the bumper 302 and the ground 308, and tracks a trajectory of motion in response to a determination that a human foot is present within the space 310.

The method 1300 includes reception of digital radar data (in step 1302) by the millimeter-wave radar sensor. To obtain the digital radar data, a series of chirps is transmitted and subsequently received by a millimeter-wave radar sensor, such as millimeter-wave radar sensors 102, 202, 220 and 232 shown in FIGS. 1, 2A, 2B and 2C, respectively. These radar measurements, which can include baseband beat frequencies, are digitized and stored as digital radar data. In step 1304, signal conditioning and range preprocessing is performed. During step 1304, digital radar data is filtered, DC components are removed, and the IF data is cleared, as discussed above in reference to step 904 in FIG. 9. Subsequently, radar range profiles (in step 1308) are generated by performing a windowing and an FFT operation across fast-time (in step 1306), according to methods known in the art. The step 1306 may be similar to the range FFT step 906 shown and described above in reference to FIG. 9.

In steps 1310 and 1312, range-azimuth images are generated, for example, by stitching multiple receiver data together for improved angular resolution using methods known in the art. In step 1310, an azimuth FFT (e.g. an FFT across receiver antennas) is performed using higher order beamforming and super-resolution techniques known in the art. In various embodiments, the range-azimuth images provide an indication as to the angular location of the detected objects with respect to the position of the millimeter-wave radar sensor. In alternative embodiments, other transform types could be used besides an FFT for generating the range-azimuth images, such as a Discrete Fourier Transform (DFT) or other transform types such as a z-transform.

In step 1314, the range-azimuth images from step 1312 are input into a machine learning engine that executes a machine learning algorithm such as, but not limited to, a random forest algorithm, a support vector machine (SVM) algorithm, an adaptive boosting (AdaBoost) algorithm and/or a neural network algorithm. The machine learning engine 1314 is configured to determine whether the target 112, 114 present in the space 310 between the bumper 302 and the ground 308 is a human foot (in step 1316), e.g. using detection and classification algorithms known in the art. In response to a determination (in step 1318) that a human foot 112 is present in the space 310 between the bumper 302 and the ground 308, a windowing and FFT across slow-time (e.g. in step 1320) is executed on the result of the signal conditioning step 1304. It is noted that conventional range-Doppler processing may be performed in step 1320, where such processing collects a coherent processing interval (CPI) of fast-time/slow-time data and performs a slow-time FFT on all range bins to convert it to a range-Doppler matrix. When the target 112 does not remain within a single range bin over the CPI, range migration is said to occur. The target Doppler signature may therefore smear in both range and Doppler. It smears in range because portions of the target signature appear in more than one range bin. It smears in Doppler because any one range bin contains the signature for only a portion of the CPI. Since Doppler resolution (e.g. determined by a width of the asinc mainlobe) in a given range bin is inversely proportional to signal duration in that range bin, the reduced duration degrades the Doppler resolution (e.g. by broadening the mainlobe). Range migration may be more severe for fast-moving targets 112. Consequently, range migration correction is accomplished in step 1321 to remove the detrimental effects of smearing in both range and Doppler, according to methods known in the art. The result of step 1321 is then subjected to a phase gradient algorithm (in step 1322), which analyzes phase data, over time, from one frame to the next, and which subsequently stiches together the different frames to create a reliable ISAR image over range-Doppler (in step 1324).

The method 1300 then proceeds to a machine learning engine that executes a machine learning algorithm such as, but not limited to, a random forest algorithm, a support vector machine (SVM) algorithm, an adaptive boosting (AdaBoost) algorithm and/or a neural network algorithm. The machine learning engine 1326 is configured to determine whether the human foot signature is associated with opening or closing the trunk 306 of the vehicle 300 (in step 1328). Step 1328 of method 1300 may be executed using detection and classification algorithms known in the art.

It is noted that while the description above assumes that the second object 114 is a false trigger, motion or vibration generated while loading an individual into a passenger seat or while closing of a vehicle door could also act as false trigger. Nonetheless, the above-described approach of FIGS. 8 to 13 discriminates between valid foot movements and false triggers that may be generated by motion or vibration.

Figure 14A:
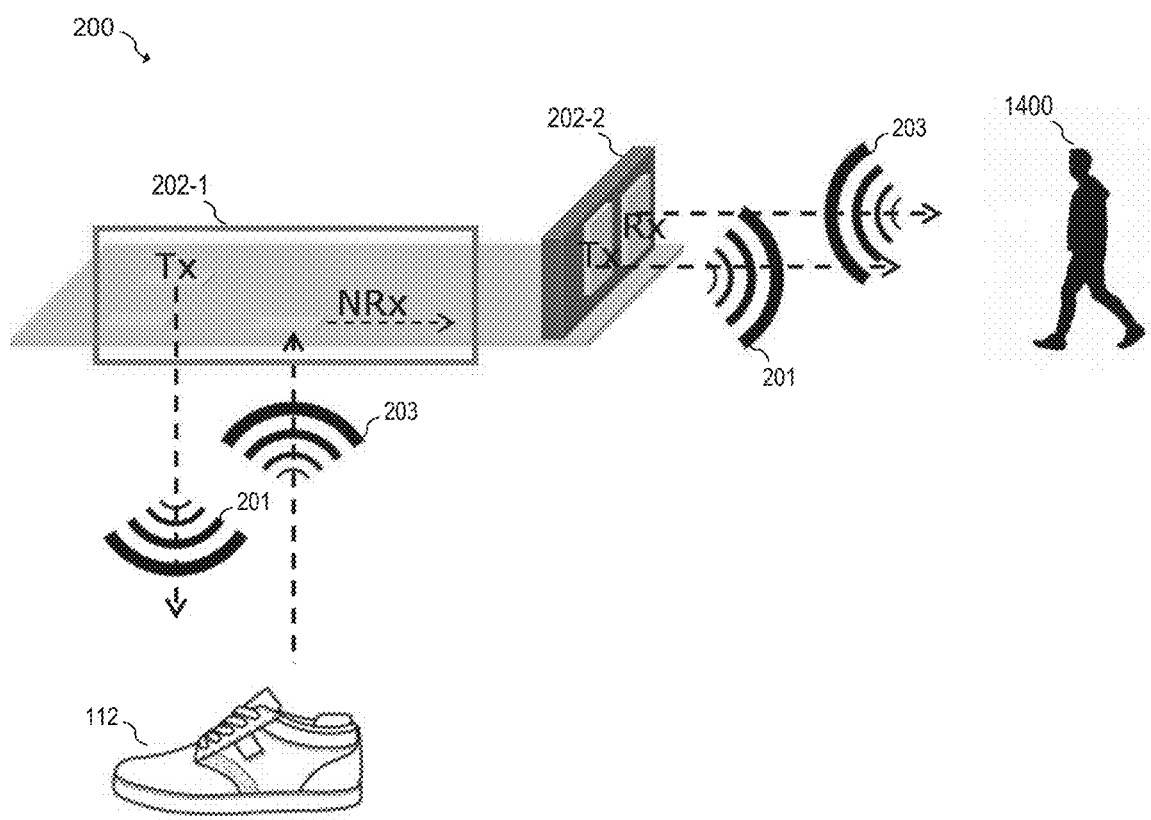
FIGS. 14A and 14B shows a millimeter-wave radar sensor system configured to determine whether an obstacle is present in a particular region of space.

The millimeter-wave radar sensor system 200 may be a multi-purpose and multi-functional system that, in addition to determining whether a human foot signature is present in a tracked motion trajectory and whether such a human foot signature is associated with opening or closing the trunk 306 of the vehicle 300 (i.e., foot sensing), also determines whether obstructions are present that would impede or prevent the opening or closing of the trunk 306 of the vehicle 300 (i.e., obstruction sensing). FIG. 14A shows a millimeter-wave radar sensor system 200 that executes both obstruction sensing and foot motion sensing, in accordance with an embodiment. The millimeter-wave radar sensor system 200 of FIG. 14A includes a first millimeter-wave radar sensor circuit 202-1 and a second millimeter-wave radar sensor circuit 202-2. In some embodiments, the second millimeter-wave radar sensor circuit 202-2 may be located or positioned in the region 304 of the bumper 302 that is between the trunk 306 and the ground 308 over which the bumper 302 is located. In other embodiments, the second millimeter-wave radar sensor circuit 202-2 may be located or positioned at other parts of the vehicle 300, such as in the trunk 306 and/or the doors of the vehicle 300.

Figure 14B:
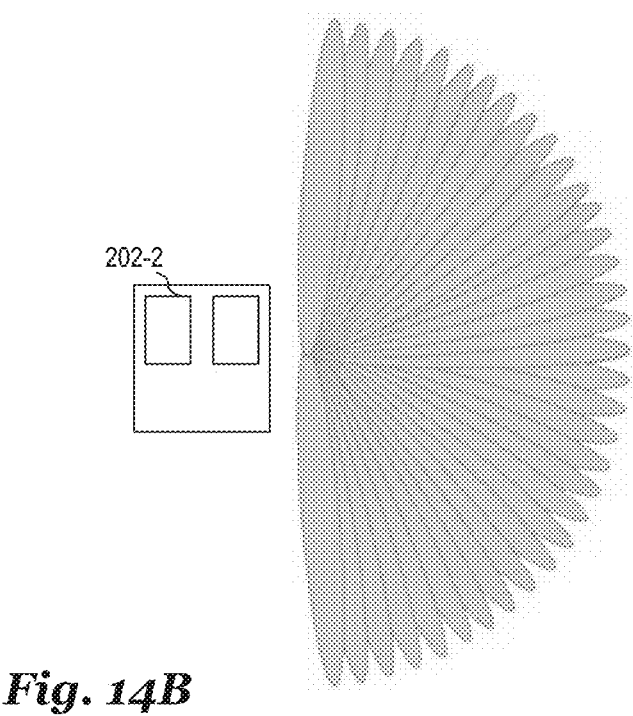

The first millimeter-wave radar sensor circuit 202-1 may function as discussed above and may determine whether a human foot signature is present in a tracked motion trajectory and whether such a human foot signature is associated with opening or closing the trunk 306 of the vehicle 300. In response to the first millimeter-wave radar sensor circuit 202-1 determining that a human foot signature is present in a tracked motion trajectory and that such a human foot signature is associated with opening or closing the trunk 306 of the vehicle 300, the second millimeter-wave radar sensor circuit 202-2 is activated to determine whether an object 1400 (e.g. a wall, another human being, a neighboring vehicle) is within a predetermined distance from the trunk 306 of the vehicle 300. If the second millimeter-wave radar sensor circuit 202-2 determines that an obstruction is present, the opening or closing of the trunk 306 of the vehicle 300 may be disabled to avert damage to the vehicle 300. However, if the second millimeter-wave radar sensor circuit 202-2 determines that an obstruction is absent, the opening or closing of the trunk 306 of the vehicle 300 is allowed to proceed. In some embodiments, the second millimeter-wave radar sensor circuit 202-2 may operate in an FMCW mode. Additionally or alternatively, the second millimeter-wave radar sensor circuit 202-2 may be configured to execute multiple receive beamforming (such as is depicted in FIG. 14B) in order to determine whether obstructions are present. Such receive beamforming may include phase monopulse beamforming, conformal beamforming, switched antenna beamforming, as examples.

The present disclosure presents a system and method for controlling access to a trunk of a vehicle using a millimeter-wave radar sensor. The proposed system and method allows for a human being to interact with the vehicle (e.g. via movement of a foot of the human being) in order to open or close the trunk of the vehicle. As described in the following paragraphs, the proposed system and method provide advantages over current and past solutions, with such advantages including robustness against EMC disturbances; robustness against false alarm rates (e.g. by implementing machine learning algorithms); the radar sensors being able to be optimized/operable with conductive bumpers; the radar sensors being agnostic to environmental conditions or impact, and thus being able to operate robustly in wet or salt water conditions, dust, fog, and low-light conditions; and the radar sensors being able to be embedded in the bumper in small form-factors. The proposed system and method are also able to detect a human foot and to recognize a human foot signature, thus reducing false alarms and eliminating other environmental interferences. The proposed system and method are further able to eliminate Doppler-sensed motion from other objects in the vicinity of the radar sensor, further reducing false alarms.

Other advantages of the proposed system and method include the ability of the proposed system and method to measure the signals coming from a human-foot and to open the trunk in response a determination that the motion of the human foot corresponds to a human foot signature. In other words, tracking can be implemented to understand a human foot pattern and to validate the signature of the human foot set by the car owner to open the trunk. The proposed system and method is also more than merely a Doppler processing system since measurement of Doppler is performed to understand the pattern of the human-foot, and, additionally, a direction of arrival estimation is performed to understand the direction of motion. The proposed system and method also reduces false alarm rates (e.g. caused by animals, human-hand motion, etc.) by the inclusion of machine learning engines detect/identify a human foot motion pattern. The proposed system and method also allows for personalization of a human-foot signature by associating a particular trajectory of motion of the human foot to a particular user and/or to a particular response by the vehicle.

The proposed system and method further allows for multi-function purposes, such as opening/closing a trunk and also ensuring the trunk is prevented from opening/closing if there is an obstacle that might hinder the movement of the trunk.

Figure 15:
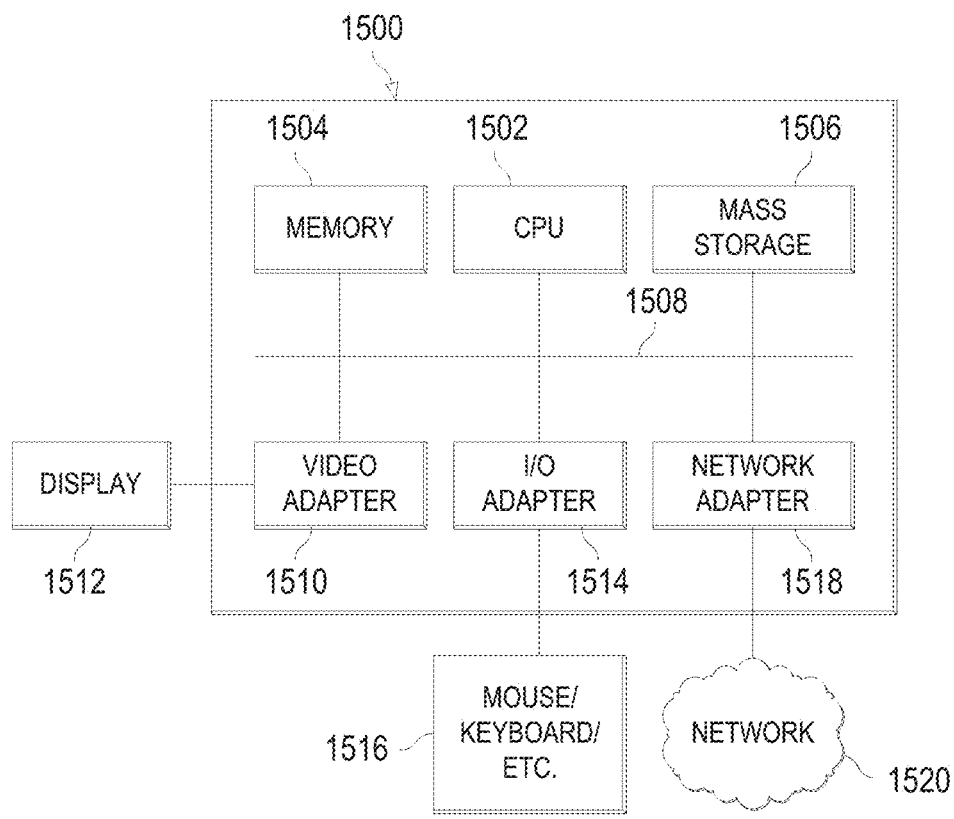
FIGS. 15 and 16 show block diagrams of a processing system that may be used to implement portions of embodiment radar sensor systems.

Referring now to FIG. 15, a block diagram of a processing system 1500 is provided in accordance with an embodiment of the present invention. The processing system 1500 depicts a general-purpose platform and the general components and functionality that may be used to implement portions of the embodiment radar based systems discussed herein. The processing system 1500 may include, for example, a central processing unit (CPU) 1502, memory 1504, and a mass storage device 1506 connected to a bus 1508 configured to perform the processes discussed above. The processing system 1500 may further include, if desired or needed, a video adapter 1510 to provide connectivity to a local display 1512 and an input-output (I/O) Adapter 1514 to provide an input/output interface for one or more input/output devices 1516, such as a mouse, a keyboard, printer, tape drive, CD drive, or the like.

The processing system 1500 also includes a network interface 1518, which may be implemented using a network adaptor configured to be coupled to a wired link, such as an Ethernet cable, USB interface, or the like, and/or a wireless/cellular link for communications with a network 1520. The network interface 1518 may also include a suitable receiver and transmitter for wireless communications. It should be noted that the processing system 1500 may include other components. For example, the processing system 1500 may include power supplies, cables, a motherboard, removable storage media, cases, and the like. These other components, although not shown, are considered part of the processing system 1500.

Figure 16:
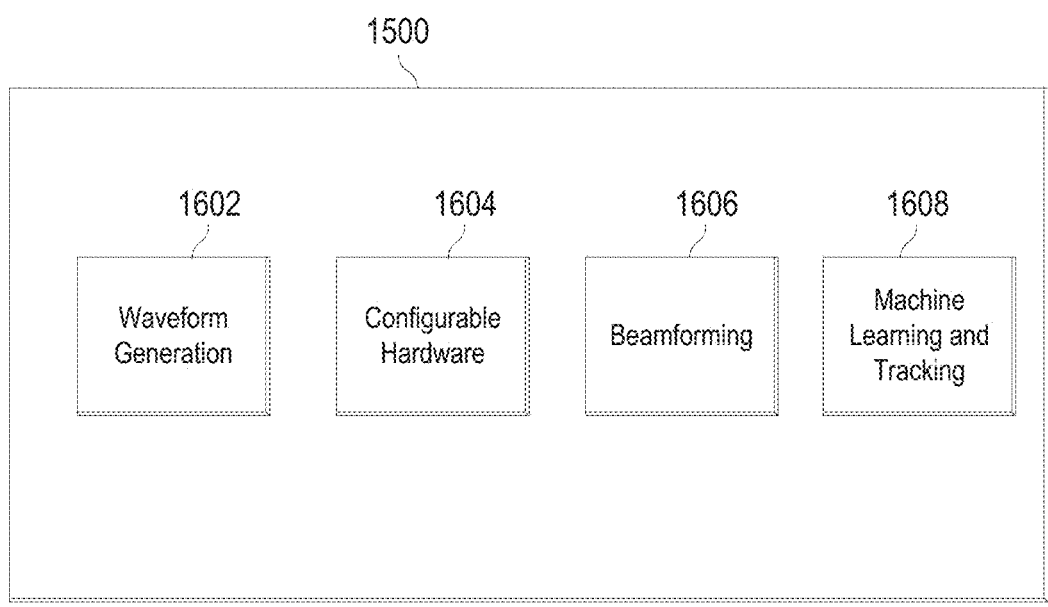

The processing system 1500 of FIG. 15 may also be depicted as a plurality of software blocks, as depicted in FIG. 16. In some embodiments, the plurality of software blocks of FIG. 16 may be stored in memory 1504. As shown in FIG. 16, the processing system 1500 may include a waveform generation block 1602 that may be used by the millimeter-wave radar sensor system 200 to generate incident RF signals 201 and that cause the millimeter-wave radar sensor system 200 to operate in an FMCW mode, a continuous wave (CW) mode, frequency shift keying (FSK) mode and/or pulse mode. The processing system 1500 may also include a configurable hardware block 1604 that supports conformal antennas, switched antennas, waveform support, and the various configurations depicted in FIGS. 7A to 7D. The processing system 1500 may also include a beamforming block 1606 that causes the second millimeter-wave radar sensor circuit 202-2 shown in FIG. 14A to execute multiple receive beamforming (such as is depicted in FIG. 14B) in order to determine whether obstructions are present. Such receive beamforming may include phase monopulse beamforming, conformal beamforming, switched antenna beamforming, as examples. The processing system 1500 may also include a machine learning and tracking block 1608 that executes the methods depicted in FIGS. 8-13, examples being Kalman filtering for motion tracking, detection of false triggers and presence of a human foot, and tracking of foot movement.

An embodiment method includes: receiving radar data at a millimeter-wave radar sensor, the radar data being generated in response to an incident radio-frequency signal reflecting off an object located in a field of view of the millimeter-wave radar sensor; filtering the radar data to generate a first-filtered signal; determining a trajectory of motion corresponding to the first-filtered signal; and determining whether the trajectory of motion corresponds to a human signature, the human signature being associated with a respective operation of a vehicle.

An embodiment system includes: a processing system configured to be coupled to a millimeter-wave radar sensor. The processing system is configured to: instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; filter the radar data to generate a first-filtered signal; determine a trajectory of motion corresponding to the first-filtered signal; and determine whether the trajectory of motion corresponds to a human signature, the human signature being associated with a respective operation of a vehicle.

An embodiment non-transitory computer readable storage medium includes an executable program stored thereon. The executable program includes instructions to: instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; filter the radar data to generate a first-filtered signal; determine a trajectory of motion corresponding to the first-filtered signal; and determine whether the trajectory of motion corresponds to a human signature, the human signature being associated with a respective operation of a vehicle.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
 receiving radar data at a millimeter-wave radar sensor, the radar data being generated in response to an incident radio-frequency signal reflecting off an object located in a field of view of the millimeter-wave radar sensor; and
 using a digital processor,
  digitally filtering the radar data to generate a first-filtered signal, wherein digitally filtering the radar data comprises
   determining a range-gate of the radar data comprising a potential motion signal,
   capturing slow-time radar data corresponding to the range-gate across a macro-Doppler frame, and
   performing a Gabor time-frequency transform on the slow-time radar data to generate the first-filtered signal,
  determining a trajectory of motion corresponding to the first-filtered signal, and
  determining whether the trajectory of motion corresponds to a predefined human signature pattern of a plurality of predefined human signal patterns, wherein the plurality of predefined human signature patterns are associated with a respective operation of a vehicle.

2. The method of claim 1, further comprising executing the respective operation of the vehicle in response to a determination that the trajectory of motion corresponds to the predefined human signature pattern of a plurality of predefined human signal patterns.

3. The method of claim 1, further comprising:
   determining whether an obstruction is present in the field of view of the millimeter-wave radar sensor; and
   inhibiting execution of the respective operation of the vehicle in response to a determination than that the obstruction is present.

4. The method of claim 1, wherein determining the range-gate of the radar data comprising the potential motion signal comprises:
   determining a plurality of averages for a plurality of range-gates in the field of view of the millimeter-wave radar sensor, each average corresponding to a respective range-gate; and
   selecting a maximum one of the plurality of averages as the range-gate of the radar data comprising the potential motion signal.

5. The method of claim 1, wherein performing the Gabor time-frequency transform on the slow-time radar data to generate the first-filtered signal comprises:
   filtering the slow-time radar data with a window function that is localized in time and frequency to generate a windowed time-frequency signal.

6. The method of claim 5, wherein the window function comprises a rectangular window function, a triangular window function, a Hanning window function, a Hamming window function, a Gaussian window function, or a Blackman window function.

7. The method of claim 1, wherein performing the Gabor time-frequency transform on the slow-time radar data to generate the first-filtered signal comprises:
   providing the slow-time radar data to a plurality of parallel Gabor time-frequency transforms, each Gabor time-frequency transform of the plurality of parallel Gabor time-frequency transforms being associated with a respective window function that is localized in a respective time and a respective frequency to generate a respective windowed time-frequency signal;
   aggregating the windowed time-frequency signals output from the plurality of parallel Gabor time-frequency transforms to form an aggregate signal; and
   sampling the aggregate signal to generate the first-filtered signal.

8. The method of claim 1, wherein determining the trajectory of motion corresponding to the first-filtered signal comprises:
   generating a sequence of inverse radar with synthetic aperture (ISAR) images from the first-filtered signal;
   filtering the sequence of ISAR images to generate a filtered sequence of ISAR images;
   identifying a target scatterer from the filtered sequence of ISAR images; and
   tracking a motion of the target scatterer using an interactive multiple model (IMM) filter.

9. The method of claim 8, wherein filtering the sequence of ISAR images to generate the filtered sequence of ISAR images comprises filtering the sequence of ISAR images using a CLEAN filtering algorithm.

10. The method of claim 8, wherein identifying the target scatterer from the filtered sequence of ISAR images comprises comparing the filtered sequence of ISAR images against a Doppler threshold, and retaining signals greater than the Doppler threshold.

11. The method of claim 8, wherein determining whether the trajectory of motion corresponds to the predefined human signature pattern of a plurality of predefined human signal patterns comprises:
   comparing the trajectory of motion against each of a plurality of predetermined motion patterns; and
   determining whether the trajectory of motion corresponds to a predetermined motion pattern of the plurality of predetermined motion patterns.

12. The method of claim 1, wherein digitally filtering the radar data to generate the first-filtered signal comprises:
   generating a plurality of radar range profiles from the radar data;
   generating a plurality of range-azimuth images from the plurality of radar range profiles;
   determining whether at least a part of a human body is present in the field of view of the millimeter-wave radar sensor based on the plurality of range-azimuth images; and
   performing a first windowing operation and a first Fast-Fourier transform (FFT) operation across slow-time of the radar data to generate the first-filtered data.

13. The method of claim 12, wherein generating the plurality of radar range profiles from the radar data comprises performing a second windowing operation and a second Fast-Fourier transform (FFT) operation across fast-time of the radar data.

14. The method of claim 12, wherein generating the plurality of range-azimuth images from the plurality of radar range profiles comprises performing a third windowing operation and a third FFT operation across receive antennas of the millimeter-wave radar sensor.

15. The method of claim 12, wherein determining whether at least the part of the human body is present in the field of view of the millimeter-wave radar sensor based on the plurality of range-azimuth images comprises executing a machine learning algorithm.

16. The method of claim 12, wherein determining the trajectory of motion corresponding to the first-filtered signal comprises:
   generating an ISAR image over a range-Doppler based on the first-filtered signal; and
   executing a machine learning algorithm on the ISAR image to determine the trajectory of motion corresponding to the first-filtered signal.

17. A system, comprising:
   a digital processing system configured to be coupled to a millimeter-wave radar sensor, wherein the digital processing system is configured to:
   instruct the millimeter-wave radar sensor to transmit a series of chirps within a field of view of the millimeter-wave radar sensor;
   identify a set of targets within the field of view based on radar data received by the millimeter-wave radar sensor and in response to transmission of the series of chirps;
   digitally filter the radar data to generate a first-filtered signal, wherein digitally filtering the radar data comprises
      determining a range-gate of the radar data comprising a potential motion signal,
      capturing slow-time radar data corresponding to the range-gate across a macro-Doppler frame; and
      performing a Gabor time-frequency transform on the slow-time radar data to generate the first-filtered signal;
   determine a trajectory of motion corresponding to the first-filtered signal; and determine whether the trajectory of motion corresponds to a predefined human signature pattern of a plurality of predefined human signal patterns, wherein the plurality of predefined human signature patterns are associated with a respective operation of a vehicle; and execute the respective operation of the vehicle in response to a determination that the trajectory of motion corresponds to the predefined human signature patter of the plurality of predefined human signature patterns.

18. The system of claim 17, further comprising the millimeter-wave radar sensor, wherein the millimeter-wave radar sensor is located at a surface of a back-side bumper of a vehicle.

19. The system of claim 18, wherein the field of view of the millimeter-wave radar sensor comprises a first region of space exterior to the vehicle and located between a lower surface of the back-side bumper of the vehicle and a plane over which the back-side bumper is located.

20. The system of claim 19, wherein the trajectory of motion comprises a motion path within the first region of space.

21. The system of claim 20, further comprising a second millimeter-wave radar sensor located at the back-side bumper, a door, a trunk of the vehicle, or a combination thereof.

22. The system of claim 21, wherein the processing system is further configured to:

instruct the second millimeter-wave radar sensor to transmit a series of chirps within a field of view of the second millimeter-wave radar sensor, wherein the field of view of the second millimeter-wave radar sensor comprises a second region of space exterior to the vehicle;

determine whether an obstruction is present in the second region of space based on radar data received by the second millimeter-wave radar sensor; and inhibit execution of the respective operation of the vehicle in response to a determination than the obstruction is present.

23. A non-transitory computer readable storage medium with an executable program stored thereon, the executable program including instructions to:

instruct a millimeter-wave radar sensor to transmit a series of chirps within a field of view of the millimeter-wave radar sensor;

identify a set of targets within the field of view based on radar data received by the millimeter-wave radar sensor and in response to transmission of the series of chirps;

digitally filter the radar data to generate a first-filtered signal, wherein digitally filtering the radar data comprises determining a range-gate of the radar data comprising a potential motion signal, capturing slow-time radar data corresponding to the range-gate across a macro-Doppler frame, and performing a Gabor time-frequency transform on the slow-time radar data to generate the first-filtered signal;

determine a trajectory of motion corresponding to the first-filtered signal; and determine whether the trajectory of motion corresponds to a predefined human signature pattern of a plurality of predefined human signal patterns, the plurality of predefined human signature being associated with a respective operation of a vehicle.

24. The method of claim 1, wherein the plurality of predefined human signature patterns are associated with a motion pattern of a human foot.

* * * * *

UNITED STATES PATENT AND TRADEMARK OFFICE
CERTIFICATE OF CORRECTION

PATENT NO. : 10,775,493 B2  
APPLICATION NO. : 15/938478  
DATED : September 15, 2020  
INVENTOR(S) : Avik Santra et al.

Page 1 of 1

It is certified that error appears in the above-identified patent and that said Letters Patent is hereby corrected as shown below:

In the Claims

In Column 21, Line 1, Claim 2, delete "signature pattern of a plurality" and insert --signature pattern of the plurality--.

In Column 21, Line 7, Claim 3, delete "determination than that" and insert --determination that--.

In Column 22, Line 3, Claim 11, delete "signature pattern of a plurality" and insert --signature pattern of the plurality--.

In Column 23, Line 13, Claim 18, delete "a vehicle" and insert --the vehicle--.

In Column 23, Line 28, Claim 22, delete "a series of chirps" and insert --a further series of chirps--.

In Column 24, Line 2, Claim 22, delete "determination than the" and insert --determination that the--.

Signed and Sealed this  
Eighth Day of December, 2020

Andrei Iancu  
*Director of the United States Patent and Trademark Office*